United States Patent
Ishihara et al.

(10) Patent No.: US 7,034,859 B2
(45) Date of Patent: Apr. 25, 2006

(54) OPTICAL SCANNING DEVICE AND IMAGE FORMING APPARATUS USING THE SAME

(75) Inventors: Keiichiro Ishihara, Yokohama (JP); Hiroshi Sato, Utsunomiya (JP); Manabu Kato, Utsunomiya (JP); Hidekazu Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 10/633,521

(22) Filed: Aug. 5, 2003

(65) Prior Publication Data

US 2004/0104994 A1 Jun. 3, 2004

(30) Foreign Application Priority Data

| Aug. 8, 2002 | (JP) | ............................. 2002-231020 |
| Aug. 8, 2002 | (JP) | ............................. 2002-231021 |
| Aug. 8, 2002 | (JP) | ............................. 2002-231022 |

(51) Int. Cl.
  *G02B 26/10* (2006.01)
  *B41J 2/47* (2006.01)

(52) U.S. Cl. ..................... 347/244; 347/258; 359/205

(58) Field of Classification Search ................ 347/241, 347/243, 244, 256, 258, 259–261; 359/205–207
See application file for complete search history.

(56) References Cited

U.S. PATENT DOCUMENTS

| 4,638,471 A | 1/1987 | van Rosmalen | ........... 369/44.14 |
| 4,804,981 A | 2/1989 | Prakash et al. | .............. 346/160 |
| 5,025,268 A | 6/1991 | Arimoto et al. | ............. 346/108 |
| 5,343,325 A | 8/1994 | Yamakawa | ................... 359/205 |
| 5,648,865 A | 7/1997 | Iizuka | ......................... 359/208 |
| 5,715,078 A | 2/1998 | Shiraishi | ..................... 359/204 |
| 5,883,732 A * | 3/1999 | Takada et al. | .............. 359/207 |
| 5,995,131 A | 11/1999 | Fujibayashi et al. | ........ 347/258 |
| 6,038,053 A | 3/2000 | Kato | .......................... 359/205 |
| 6,046,835 A | 4/2000 | Yamawaki et al. | ......... 359/205 |
| 6,094,286 A | 7/2000 | Kato | .......................... 359/206 |
| 6,104,521 A | 8/2000 | Iizuka | ......................... 359/205 |
| 6,133,935 A | 10/2000 | Fujibayashi et al. | ........ 347/258 |
| 6,166,843 A | 12/2000 | Iizuka | ......................... 359/208 |
| 6,330,524 B1 | 12/2001 | Suzuki et al. | ............... 702/159 |
| 6,359,717 B1 | 3/2002 | Suzuki et al. | ............... 359/205 |

(Continued)

FOREIGN PATENT DOCUMENTS

EP     730182     9/1996

(Continued)

*Primary Examiner*—Huan Tran
(74) *Attorney, Agent, or Firm*—Fitzpatrick, Cella, Harper & Scinto

(57) ABSTRACT

Disclosed is an optical scanning device which includes a light source device, a deflecting system for deflecting a light beam emitted from the light source device, and a scanning optical system for scanning a surface to be scanned, with the light beam deflected by the deflecting system, wherein the scanning optical system includes a scanning optical element disposed so that, with respect to a sub-scan direction, a principal ray of the deflected light beam passes a portion other than an optical axis, wherein the scanning optical element has a sagittal aspherical amount changing surface in which an aspherical amount of a sagittal changes along a main scan direction of the scanning optical element, and wherein, throughout the whole surface to be scanned, the position in the sub-scan direction upon which the deflected light beam impinges is made even.

31 Claims, 22 Drawing Sheets

U.S. PATENT DOCUMENTS

| | | | |
|---|---|---|---|
| 6,388,792 B1 | 5/2002 | Atsuumi et al. | 359/207 |
| 6,424,446 B1 | 7/2002 | Toyoda et al. | 359/205 |
| 6,493,126 B1 | 12/2002 | Iizuka | 359/205 |
| 6,542,278 B1 | 4/2003 | Kato | 359/205 |
| 6,593,951 B1 | 7/2003 | Yokoyama et al. | 347/138 |
| 2002/0149668 A1 | 10/2002 | Kato | 347/244 |
| 2003/0025784 A1 | 2/2003 | Sato et al. | 347/244 |
| 2003/0043442 A1 | 3/2003 | Ishihara et al. | 359/205 |
| 2003/0048352 A1 | 3/2003 | Kato et al. | 347/258 |
| 2003/0053185 A1 | 3/2003 | Shimomura et al. | 359/197 |
| 2004/0047019 A1* | 3/2004 | Ishihara | 359/205 |

FOREIGN PATENT DOCUMENTS

| | | |
|---|---|---|
| EP | 1 122 579 | 8/2001 |
| EP | 1122579 | 8/2001 |
| EP | 1260847 | 11/2002 |
| EP | 1265434 | 12/2002 |
| JP | 7-191272 | 7/1995 |
| JP | 9-90254 | 4/1997 |
| JP | 9-184991 | 7/1997 |
| JP | 2001-147392 | 5/2001 |
| JP | 2002-148542 | 5/2002 |
| JP | 2002-162587 | 6/2002 |
| RU | 2037680 | 6/1995 |

* cited by examiner

SAGITTAL ASPHERICAL AMOUNT (μm) OF EXIT SURFACE 6b

DISTANCE FROM SAGITTAL OPTICAL AXIS (Z-COORDINATES)

| Y(mm)\Z(mm) | Z=0.0 | Z=0.5 | Z=1.0 | Z=1.5 | Z=2.0 | Z=2.5 | Z=3.0 | Z=3.5 | Z=4.0 | Z=4.5 | Z=5.0 | Z=5.5 | Z=6.0 |
|---|---|---|---|---|---|---|---|---|---|---|---|---|---|
| Y=0  | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| Y=2  | 0.0000 | 0.0000 | 0.0000 | 0.0000 | 0.0000 | 0.0001 | 0.0001 | 0.0003 | 0.0004 | 0.0007 | 0.0011 | 0.0016 | 0.0022 |
| Y=4  | 0.0000 | 0.0000 | 0.0000 | 0.0000 | 0.0001 | 0.0003 | 0.0006 | 0.0010 | 0.0018 | 0.0028 | 0.0043 | 0.0063 | 0.0089 |
| Y=5  | 0.0000 | 0.0000 | 0.0000 | 0.0000 | 0.0002 | 0.0006 | 0.0012 | 0.0023 | 0.0039 | 0.0063 | 0.0096 | 0.0141 | 0.0199 |
| Y=8  | 0.0000 | 0.0000 | 0.0000 | 0.0001 | 0.0004 | 0.0011 | 0.0022 | 0.0041 | 0.0070 | 0.0111 | 0.0170 | 0.0248 | 0.0352 |
| Y=10 | 0.0000 | 0.0000 | 0.0000 | 0.0002 | 0.0007 | 0.0016 | 0.0034 | 0.0063 | 0.0108 | 0.0173 | 0.0263 | 0.0385 | 0.0545 |
| Y=12 | 0.0000 | 0.0000 | 0.0000 | 0.0003 | 0.0010 | 0.0023 | 0.0049 | 0.0090 | 0.0154 | 0.0246 | 0.0375 | 0.0549 | 0.0778 |
| Y=14 | 0.0000 | 0.0000 | 0.0001 | 0.0004 | 0.0013 | 0.0032 | 0.0065 | 0.0121 | 0.0207 | 0.0331 | 0.0504 | 0.0739 | 0.1046 |
| Y=16 | 0.0000 | 0.0000 | 0.0001 | 0.0005 | 0.0017 | 0.0041 | 0.0084 | 0.0156 | 0.0266 | 0.0426 | 0.0650 | 0.0951 | 0.1348 |
| Y=18 | 0.0000 | 0.0000 | 0.0001 | 0.0007 | 0.0021 | 0.0051 | 0.0105 | 0.0194 | 0.0332 | 0.0531 | 0.0810 | 0.1185 | 0.1679 |
| Y=20 | 0.0000 | 0.0000 | 0.0001 | 0.0008 | 0.0025 | 0.0061 | 0.0127 | 0.0236 | 0.0402 | 0.0644 | 0.0982 | 0.1437 | 0.2035 |
| Y=22 | 0.0000 | 0.0000 | 0.0002 | 0.0009 | 0.0030 | 0.0073 | 0.0151 | 0.0279 | 0.0477 | 0.0764 | 0.1164 | 0.1704 | 0.2413 |
| Y=24 | 0.0000 | 0.0000 | 0.0002 | 0.0011 | 0.0035 | 0.0085 | 0.0175 | 0.0325 | 0.0554 | 0.0888 | 0.1354 | 0.1982 | 0.2807 |
| Y=26 | 0.0000 | 0.0000 | 0.0002 | 0.0013 | 0.0040 | 0.0097 | 0.0201 | 0.0372 | 0.0634 | 0.1016 | 0.1549 | 0.2268 | 0.3212 |
| Y=28 | 0.0000 | 0.0000 | 0.0003 | 0.0014 | 0.0045 | 0.0109 | 0.0226 | 0.0419 | 0.0715 | 0.1146 | 0.1747 | 0.2557 | 0.3622 |
| Y=30 | 0.0000 | 0.0000 | 0.0003 | 0.0016 | 0.0050 | 0.0121 | 0.0252 | 0.0467 | 0.0796 | 0.1275 | 0.1944 | 0.2846 | 0.4030 |
| Y=32 | 0.0000 | 0.0000 | 0.0003 | 0.0017 | 0.0055 | 0.0134 | 0.0277 | 0.0513 | 0.0875 | 0.1402 | 0.2137 | 0.3128 | 0.4430 |
| Y=34 | 0.0000 | 0.0000 | 0.0004 | 0.0019 | 0.0059 | 0.0145 | 0.0301 | 0.0558 | 0.0951 | 0.1524 | 0.2322 | 0.3400 | 0.4815 |
| Y=36 | 0.0000 | 0.0000 | 0.0004 | 0.0020 | 0.0064 | 0.0156 | 0.0324 | 0.0599 | 0.1023 | 0.1638 | 0.2497 | 0.3655 | 0.5177 |
| Y=38 | 0.0000 | 0.0000 | 0.0004 | 0.0022 | 0.0068 | 0.0166 | 0.0344 | 0.0638 | 0.1088 | 0.1742 | 0.2656 | 0.3888 | 0.5507 |
| Y=40 | 0.0000 | 0.0000 | 0.0004 | 0.0023 | 0.0072 | 0.0175 | 0.0362 | 0.0671 | 0.1145 | 0.1834 | 0.2796 | 0.4093 | 0.5797 |
| Y=42 | 0.0000 | 0.0000 | 0.0005 | 0.0024 | 0.0076 | 0.0182 | 0.0377 | 0.0699 | 0.1193 | 0.1911 | 0.2912 | 0.4264 | 0.6038 |
| Y=44 | 0.0000 | 0.0000 | 0.0005 | 0.0024 | 0.0077 | 0.0187 | 0.0389 | 0.0720 | 0.1229 | 0.1968 | 0.3000 | 0.4392 | 0.6221 |
| Y=46 | 0.0000 | 0.0000 | 0.0005 | 0.0025 | 0.0078 | 0.0191 | 0.0396 | 0.0733 | 0.1251 | 0.2004 | 0.3055 | 0.4472 | 0.6334 |
| Y=48 | 0.0000 | 0.0000 | 0.0005 | 0.0025 | 0.0079 | 0.0192 | 0.0398 | 0.0737 | 0.1258 | 0.2015 | 0.3071 | 0.4496 | 0.6368 |
| Y=50 | 0.0000 | 0.0000 | 0.0005 | 0.0025 | 0.0078 | 0.0190 | 0.0394 | 0.0731 | 0.1247 | 0.1997 | 0.3044 | 0.4456 | 0.6312 |

DISTANCE FROM LENS SURFACE OPTICAL AXIS (Y-COORDINATES)

FIG. 3

SAGITTAL ASPHERICAL AMOUNT (μm) OF EXIT SURFACE 6b

DISTANCE FROM SAGITTAL OPTICAL AXIS (Z-COORDINATES)

| Y (mm) \ Z (mm) | Z=0.0 | Z=0.5 | Z=1.0 | Z=1.5 | Z=2.0 | Z=2.5 | Z=3.0 | Z=3.5 | Z=4.0 | Z=4.5 | Z=5.0 | Z=5.5 | Z=6.0 |
|---|---|---|---|---|---|---|---|---|---|---|---|---|---|
| Y= 0  | 0.0000 | 0.0005 | 0.0086 | 0.0433 | 0.1370 | 0.3344 | 0.6935 | 1.2847 | 2.1917 | 3.5107 | 5.3508 | 7.8341 | 11.0954 |
| Y= 2  | 0.0000 | 0.0005 | 0.0086 | 0.0433 | 0.1369 | 0.3343 | 0.6931 | 1.2841 | 2.1906 | 3.5089 | 5.3481 | 7.8302 | 11.0899 |
| Y= 4  | 0.0000 | 0.0005 | 0.0085 | 0.0433 | 0.1367 | 0.3338 | 0.6921 | 1.2821 | 2.1873 | 3.5036 | 5.3400 | 7.8184 | 11.0731 |
| Y= 5  | 0.0000 | 0.0005 | 0.0085 | 0.0431 | 0.1364 | 0.3329 | 0.6903 | 1.2789 | 2.1818 | 3.4948 | 5.3266 | 7.7986 | 11.0452 |
| Y= 6  | 0.0000 | 0.0005 | 0.0085 | 0.0430 | 0.1359 | 0.3317 | 0.6879 | 1.2744 | 2.1740 | 3.4824 | 5.3077 | 7.7710 | 11.0061 |
| Y= 8  | 0.0000 | 0.0005 | 0.0085 | 0.0428 | 0.1353 | 0.3302 | 0.6847 | 1.2686 | 2.1641 | 3.4665 | 5.2835 | 7.7355 | 10.9558 |
| Y=10  | 0.0000 | 0.0005 | 0.0084 | 0.0426 | 0.1345 | 0.3284 | 0.6809 | 1.2614 | 2.1520 | 3.4470 | 5.2538 | 7.6922 | 10.8944 |
| Y=12  | 0.0000 | 0.0005 | 0.0084 | 0.0423 | 0.1336 | 0.3262 | 0.6764 | 1.2530 | 2.1376 | 3.4241 | 5.2188 | 7.6409 | 10.8218 |
| Y=14  | 0.0000 | 0.0005 | 0.0083 | 0.0419 | 0.1326 | 0.3237 | 0.6711 | 1.2433 | 2.1211 | 3.3976 | 5.1784 | 7.5817 | 10.7380 |
| Y=16  | 0.0000 | 0.0005 | 0.0083 | 0.0416 | 0.1314 | 0.3208 | 0.6652 | 1.2323 | 2.1023 | 3.3675 | 5.1326 | 7.5147 | 10.6430 |
| Y=18  | 0.0000 | 0.0005 | 0.0082 | 0.0412 | 0.1301 | 0.3176 | 0.6586 | 1.2201 | 2.0814 | 3.3339 | 5.0815 | 7.4398 | 10.5369 |
| Y=20  | 0.0000 | 0.0005 | 0.0081 | 0.0407 | 0.1286 | 0.3141 | 0.6512 | 1.2065 | 2.0582 | 3.2968 | 5.0249 | 7.3570 | 10.4196 |
| Y=22  | 0.0000 | 0.0005 | 0.0080 | 0.0402 | 0.1271 | 0.3102 | 0.6432 | 1.1916 | 2.0328 | 3.2562 | 4.9630 | 7.2663 | 10.2912 |
| Y=24  | 0.0000 | 0.0005 | 0.0079 | 0.0397 | 0.1253 | 0.3060 | 0.6345 | 1.1754 | 2.0052 | 3.2120 | 4.8956 | 7.1677 | 10.1515 |
| Y=26  | 0.0000 | 0.0005 | 0.0078 | 0.0391 | 0.1235 | 0.3014 | 0.6250 | 1.1580 | 1.9755 | 3.1643 | 4.8229 | 7.0612 | 10.0007 |
| Y=28  | 0.0000 | 0.0005 | 0.0077 | 0.0384 | 0.1215 | 0.2965 | 0.6149 | 1.1392 | 1.9435 | 3.1131 | 4.7448 | 6.9468 | 9.8388 |
| Y=30  | 0.0000 | 0.0005 | 0.0076 | 0.0378 | 0.1193 | 0.2913 | 0.6041 | 1.1192 | 1.9093 | 3.0583 | 4.6613 | 6.8246 | 9.6656 |
| Y=32  | 0.0000 | 0.0005 | 0.0075 | 0.0370 | 0.1171 | 0.2858 | 0.5926 | 1.0978 | 1.8729 | 3.0000 | 4.5724 | 6.6944 | 9.4813 |
| Y=34  | 0.0000 | 0.0004 | 0.0073 | 0.0363 | 0.1146 | 0.2799 | 0.5804 | 1.0752 | 1.8342 | 2.9381 | 4.4781 | 6.5564 | 9.2858 |
| Y=36  | 0.0000 | 0.0004 | 0.0072 | 0.0355 | 0.1121 | 0.2737 | 0.5674 | 1.0513 | 1.7934 | 2.8727 | 4.3785 | 6.4105 | 9.0792 |
| Y=38  | 0.0000 | 0.0004 | 0.0070 | 0.0346 | 0.1094 | 0.2671 | 0.5538 | 1.0260 | 1.7504 | 2.8038 | 4.2734 | 6.2567 | 8.8614 |
| Y=40  | 0.0000 | 0.0004 | 0.0068 | 0.0337 | 0.1066 | 0.2602 | 0.5395 | 0.9995 | 1.7052 | 2.7313 | 4.1630 | 6.0950 | 8.6324 |
| Y=42  | 0.0000 | 0.0004 | 0.0067 | 0.0328 | 0.1036 | 0.2529 | 0.5245 | 0.9717 | 1.6577 | 2.6553 | 4.0472 | 5.9255 | 8.3922 |
| Y=44  | 0.0000 | 0.0004 | 0.0065 | 0.0318 | 0.1005 | 0.2454 | 0.5088 | 0.9426 | 1.6041 | 2.5758 | 3.9260 | 5.7480 | 8.1409 |
| Y=46  | 0.0000 | 0.0004 | 0.0063 | 0.0308 | 0.0973 | 0.2375 | 0.4924 | 0.9122 | 1.5562 | 2.4928 | 3.7994 | 5.5627 | 7.8784 |
| Y=48  | 0.0000 | 0.0004 | 0.0061 | 0.0297 | 0.0939 | 0.2292 | 0.4753 | 0.8805 | 1.5022 | 2.4062 | 3.6674 | 5.3694 | 7.6047 |
| Y=50  | 0.0000 | 0.0004 | 0.0059 | 0.0297 | 0.0939 | 0.2292 | 0.4753 | 0.8805 | 1.5022 | 2.4062 | 3.6674 | 5.3694 | 7.6047 |

DISTANCE FROM LENS SURFACE OPTICAL AXIS (Y-COORDINATES)

FIG. 13

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention in this aspect is suitable, for example, to various apparatuses such as a laser beam printer, a digital copying machine, a multifunction printer or the like, having an electrophotographic process wherein a single light beam or plural light beams optically modulated and emitted from light source means are reflectively deflected by a polygonal mirror (deflecting means) and, through a scanning optical system, a surface to be scanned is optically scanned whereby imagewise information is recorded thereon.

In another aspect, the present invention concerns an optical scanning device and an image forming apparatus using the same, wherein a light beam is projected in an oblique direction (oblique incidence) upon a plane perpendicular to a rotational axis of deflecting means and wherein scan line bending to be produced on a surface to be scanned, as a result of oblique incidence, is corrected, such that superior images are obtainable constantly. Furthermore, the present invention is suitable to a color image forming apparatus having one or more optical scanning devices and plural image bearing members corresponding to respective colors.

Conventionally, in optical scanning devices such as a laser beam printer (LBP), for example, a light beam optically modulated in accordance with an imagewise signal and emitted from light source means is periodically modulated by an optical deflector, comprising a rotational polygon mirror, for example. Then, through a scanning optical system having an f-θ characteristic, the light beam is focused to produce a light spot upon the surface of a photosensitive recording medium (photosensitive drum), and to optically scan that surface, whereby imagewise recording is carried out.

FIG. 20 is a schematic view of a main portion of a conventional optical scanning device.

As seen in the drawing, a divergent light beam emitted from light source means 91 is transformed by a collimator lens 92 into an approximately parallel light beam. Subsequently, the light beam is restricted by a stop 93 and then it enters a cylindrical lens 94 having a predetermined refractive power only in a sub-scan direction. As regards the approximately parallel light beam incident on the cylindrical lens 94, within a main scan sectional plane the light beam exits as it is. Within a sub-scan sectional plane, on the other hand, the light beam is collected such that it is imaged as an approximately linear image upon a deflection surface (reflection surface) 95a of deflecting means (light deflector) 95 which comprises a polygon mirror.

The light beam deflected by the deflection surface 95a of the deflecting means 95 is directed onto a photosensitive drum surface 98, which is a surface to be scanned, through a scanning optical system 96 having an f-θ characteristic. By rotating the deflecting means 95 in a direction of an arrow A, the photosensitive drum surface 98 is optically scanned in a direction of an arrow B, whereby imagewise information is recorded thereon.

In optical scanning devices such as described above, attainment of high-precision recording of imagewise information requires that the curvature of field is corrected satisfactorily throughout the whole surface to be scanned, that there is a distortion characteristic (f-θ characteristic) with velocity uniformess between the angle of view (scanning angle) θ and the image height (distance from the scan center) Y, and that the spot diameter at respective image heights upon the image plane (surface to be scanned) is even. Many proposals have been made in respect to optical scanning devices or scanning optical systems, satisfying such optical characteristics.

On the other hand, where plural light beams are scanned by use of a single optical deflector, in order to separate the light beams in a sub-scan direction to meet the necessity of directing the light beams, after being scanned, to respective photosensitive members corresponding to different colors, respectively, it is required that the incident light beams are projected in an oblique direction (oblique incidence) upon a plane perpendicular to the rotational axis of the deflecting means. If a light beam is obliquely incident upon the deflecting means, it causes a phenomenon, called "scan line bending", that the scan line on the surface being scanned is bent.

Particularly, in a case of color image forming apparatuses wherein laser light is projected from optical scanning devices to four photosensitive members (photosensitive drums) to produce latent images thereon to thereby form images of an original, of colors Y (yellow), M (magenta), C (cyan) and Bk (black), respectively, upon corresponding photosensitive members, respectively, the images of four colors of Y, M, C and Bk produced on the respective photosensitive members must be superposed in registration upon a transfer material such as a paper sheet, for example. Therefore, if the scan line bending occurs in the optical scanning devices corresponding to these photosensitive members, it results in an error in shape of the scan line among the four colors, causing color displacement in an obtained image upon the transfer material. Thus, the image performance would be degraded considerably.

Some optical scanning devices have been proposed in an attempt to solving the problem of scan line bending.

Japanese Laid-Open Patent Application No. 7-191272 shows an optical scanning device wherein a light beam is projected in an oblique direction onto a plane perpendicular to the rotational axis of deflecting means. In this example, one of scanning optical elements constituting a scanning optical system comprises an anamorphic lens having an aspherical shape in its main-scan sectional shape, and the curvature radius in the sub-scan sectional plane is set independently from the main-scan sectional shape. Additionally, the optical axis thereof is disposed with eccentricity in the sub-scan direction with respect to the deflection surface of the deflecting means, whereby the scan line bending is corrected.

Japanese Laid-Open Patent Application No. 9-184991 shows an example in which a parallel plane plate used as a dust protection glass plate is disposed with tilt, thereby to correct the scan line bending.

These technology in summary concern correction of the scan line bending based on eccentric disposition of an optical element such as: displacing a scanning optical element (imaging optical element) such as an anamorphic lens, for example, included in a scanning optical system, in the sub-scan direction; or tilting an optical element such as a dust protection glass which does not have an imaging function.

However, if such optical element is disposed eccentrically in the light path, although the scan line bending might be corrected, other optical characteristics may change. Further, the amount of eccentricity of the optical element has a correction effect to the scan line bending, only in relation to a particular light beam. It is difficult to correct the scan line bending for plural light beams, simultaneously. Thus, it is necessary to use one optical element in connection with every single light beam. Where plural light beams are used, use of plural optical elements corresponding to these light beams, respectively, is necessary. This causes an increase of the number of constituent elements.

Japanese Laid-Open Patent Application No. 9-90254 shows an example wherein the sagittal of a cylindrical lens follows a non-cylindrical surface such that the wavefront of a light beam passed through the cylindrical lens is delayed at the periphery in the sub-scan direction, with respect to a reference spherical surface.

This example is based on the structure arranged to prevent degradation of image drafting performance in a case where the beam diameter in the sub-scan direction is small, causing that the beam waist becomes away from the Gauss image plane and the change in beam diameter due to defocus becomes large. It is not a structure for solving the problem of scan line bending.

Japanese Laid-Open Patent Application No. 2002-148542 and No. 2002-162587, for example, propose an example in which, in a case where plural light beams are scanned by use of a single optical deflector, differences in height are provided among the light beams with respect to a sub-scan direction and, after the light beams are projected upon a plane perpendicular to the rotational axis of the optical deflector, they are separated from each other.

However, if the separation based on differences in height of the light beams is used, it leads to an increase in height (thickness) of the optical deflector or it causes a necessity of preparing different lenses corresponding to the light beams, respectively. The structure would become very complicated.

SUMMARY OF THE INVENTION

It is an object of the present invention to provide an optical scanning device and an image forming apparatus using the same, in which a light beam is projected in an oblique direction (oblique incidence) upon a plane perpendicular to the rotational axis of deflecting means or in which a scanning optical system is disposed with eccentricity with respect to a sub-scan direction and, on the basis of it, any scan line bending to be produced can be improved significantly.

It is another object of the present invention to provide an optical scanning device of simple structure and an image forming apparatus using the same, by which the scan line bending can be stably kept very small, without restriction of disposition of an optical element such as a bending mirror, for example.

It is a further object of the present invention to provide a color image forming apparatus which comprises one or more optical scanning devices being arranged to stably keep the scan line bending very small, to assure that a superior image without color displacement is obtained stably.

In accordance with a first aspect of the present invention, to achieve at least one of the objects described above, there is provided an optical scanning device, comprising: light source means; deflecting means for deflecting a light beam emitted from said light source means; and a scanning optical system for scanning a surface to be scanned, with the light beam deflected by said deflecting means; wherein said scanning optical system includes a scanning optical element disposed so that, with respect to a sub-scan direction, a principal ray of the deflected light beam passes a portion other than an optical axis, wherein said scanning optical element has a sagittal aspherical amount changing surface in which an aspherical amount of a sagittal changes along a main scan direction of said scanning optical element, and wherein, throughout the whole surface to be scanned, the position in the sub-scan direction upon which the deflected light beam impinges is made even.

In one preferred form of this aspect of the present invention, the scanning optical system is arranged so that, within an effective scan range upon the surface to be scanned, an amount of deviation of the position in the sub-scan direction upon which the deflected light beam impinges is held to be not greater than 10 μm.

The light beam emitted from said light source means may be incident on a plane, perpendicular to a rotational axis of said deflecting means, with a certain angle defined thereto.

In the sub-scan direction, the position on the surface to be scanned, upon which a principal ray of the deflected light beam impinges, may be made closer to the optical axis of said scanning optical system, as compared with the position where the principal ray passes through the surface of said scanning optical element which surface has a largest power.

The scanning optical system may have one or more sagittal curvature radius changing surfaces in which a sagittal curvature radius changes along the main scan direction of said scanning optical system.

The scanning optical system may consist of a single scanning optical element.

The scanning optical system may have a power in the sub-scan direction which is equal to or approximately equal to a power of said sagittal aspherical amount changing surface.

Where the power of said scanning optical system in the sub-scan direction is $\varnothing_{so}$ and the power of said sagittal aspherical amount changing surface in the sub-scan direction is $\varnothing_{si}$, a relation $0.9 \times \varnothing_{so} \leq \varnothing_{si} \leq 1.1 \times \varnothing_{so}$ may be satisfied.

The light source means may emit two or more light beams, and, within the sub-scan sectional plane, a principal ray of at least one light beam may pass an upper side with respect to the optical axis of said scanning optical system while a principal ray of at least one different light beam may pass a lower side with respect to the optical axis of said scanning optical system.

The deflecting means may deflect plural light beams, said scanning optical system may include a plurality of scanning optical elements for imaging the light beams deflected by said deflecting means, upon a plurality of surfaces to be scanned, which surfaces correspond to the light beams, respectively, and said deflecting means may be shared by plural scanning optical systems.

Where, within the main scan sectional plane, an air-converted distance from said deflecting means to a light exit surface of said scanning optical element along the optical axis is P1, a distance from the light exit surface of said scanning optical element to the surface to be scanned is P2, an air-converted distance from said deflecting means, being out of the axis, to the light exit surface of said scanning optical element is M1, and a distance from the light exit surface of said scanning optical element to the surface to be scanned is M2, the following relation may be satisfied:

$$0.9 \times \frac{P2}{P1} \leq \frac{M2}{M1} \leq 1.1 \times \frac{P2}{P1}$$

In accordance with a second aspect of the present invention, there is provided an image forming apparatus, comprising: an optical scanning device as recited in relation to the first aspect; a photosensitive member disposed at a position of the surface to be scanned as aforesaid; a developing device for developing an electrostatic latent image formed on said photosensitive member with a light beam scanned with said optical scanning device, to produce a toner image; a transfer device for transferring the developed toner image to a transfer material; and a fixing device for fixing the transferred toner image on the transfer material.

In accordance with a third aspect of the present invention, there is provided an image forming apparatus, comprising: an optical scanning device as recited in relation to the first aspect; and a printer controller for converting code data, inputted from an external equipment, into an imagewise signal and for applying the imagewise signal to said optical scanning device.

In accordance with a fourth aspect of the present invention, there is provided a color image forming apparatus, comprising: at least one optical scanning device as recited in relation to the first aspect; and a plurality of image bearing members on which images of different colors are to be formed.

In one preferred form of this aspect of the present invention, the apparatus further comprises a printer controller for converting a color signal, inputted from an external equipment, into imagewise data of different colors and for applying the imagewise data to corresponding optical scanning devices, respectively.

In accordance with a fifth aspect of the present invention, there is provided an optical scanning device, comprising: light source means; deflecting means for deflecting a light beam emitted from said light source means; and a scanning optical system for scanning a surface to be scanned, with the light beam deflected by said deflecting means; wherein said scanning optical system includes a scanning optical element arranged so that, upon the surface to be scanned and with respect to a sub-scan direction, imaging positions of two light beams being obliquely incident on a plane, perpendicular to a rotational axis of said deflecting means, with certain oblique incidence angles γ and γ' (0≠γ<γ'), respectively, are approximately registered with each other.

In one preferred form of this aspect of the present invention, the scanning optical element has an optical function with which, within an effective scan range upon the surface to be scanned, an amount of deviation of the position in the sub-scan direction upon which the two light beams impinge can be held to be not greater than 10 µm.

The scanning optical element may be arranged so that, where a focal length of said scanning optical system in the sub-scan direction is fs, the spherical aberration in the sub-scan direction is not greater than 0.05 fs, throughout the whole region where the oblique incidence angle of the light beam is not greater than γ.

The scanning optical element may be disposed so that, with respect to the sub-scan direction, a principal ray of the light beam deflected by said deflecting means passes a portion other than an optical axis, and said scanning optical element may have a sagittal aspherical amount changing surface in which an aspherical amount of a sagittal changes along a main scan direction of said scanning optical element.

The scanning optical element may be disposed so that, with respect to the sub-scan direction, a principal ray of the light beam reflectively deflected by said deflecting means passes a portion other than an optical axis, and the scanning optical element may have a diffracting portion having an aspherical surface function in the sub-scan direction.

The scanning optical element may have one or more sagittal curvature radius changing surfaces in which a sagittal curvature radius changes along the main scan direction of said scanning optical element.

The scanning optical system may consist of a single scanning optical element.

The scanning optical system may have a refractive power in the sub-scan direction which is equal to or approximately equal to a refractive power of said sagittal aspherical amount changing surface.

Where the power of said scanning optical system in the sub-scan direction is $\varnothing_{so}$ and the power of said sagittal aspherical amount changing surface in the sub-scan direction is $\varnothing_{si}$, a relation $0.9 \times \varnothing_{so} \leq \varnothing_{si} \leq 1.1 \times \varnothing_{so}$ may be satisfied.

The scanning optical element may be disposed so that, in the sub-scan direction, a principal ray of the light beam reflectively deflected by said deflecting means passes a portion other than an optical axis, and, through bending of plural surfaces of said scanning optical element, spherical aberration in the sub-scan direction may be corrected throughout the whole region where the oblique incidence angle is not greater than γ.

The light source means may emit two or more light beams, and, within the sub-scan sectional plane, a principal ray of at least one light beam may pass an upper side with respect to the optical axis of said scanning optical element while a principal ray of another light beam may pass a lower side with respect to the optical axis of said scanning optical element.

The deflecting means may deflect plural light beams, said scanning optical system may include a plurality of scanning optical elements for imaging the light beams deflected by said deflecting means, upon a plurality of surfaces to be scanned, which surfaces correspond to the light beams, respectively, and said deflecting means may be shared by plural scanning optical systems.

The oblique incidence angle γ may satisfy a relation $0° < \gamma < 10°$.

Where, within the main scan sectional plane, an air-converted distance from said deflecting means to a light exit surface of said scanning optical element along the optical axis is P1, a distance from the light exit surface of said scanning optical element to the surface to be scanned is P2, an air-converted distance from said deflecting means, being out of the axis, to the light exit surface of said scanning optical element is M1, and a distance from the light exit surface of said scanning optical element to the surface to be scanned is M2, the following relation may be satisfied:

$$0.9 \times \frac{P2}{P1} \leq \frac{M2}{M1} \leq 1.1 \times \frac{P2}{P1}$$

In accordance with a sixth aspect of the present invention, there is provided an image forming apparatus, comprising: an optical scanning device as recited in relation to the fifth aspect; a photosensitive member disposed at a position of the surface to be scanned as aforesaid; a developing device for developing an electrostatic latent image formed on said photosensitive member with a light beam scanned with said optical scanning device, to produce a toner image; a transfer device for transferring the developed toner image to a transfer material; and a fixing device for fixing the transferred toner image on the transfer material.

In accordance with a seventh aspect of the present invention, there is provided an image forming apparatus, comprising: an optical scanning device as recited in relation to the fifth aspect; and a printer controller for converting code data, inputted from an external equipment, into an imagewise signal and for applying the imagewise signal to said optical scanning device.

In accordance with an eighth aspect of the present invention, there is provided a color image forming apparatus, comprising: at least one optical scanning device as recited in relation to the fifth aspect; and a plurality of image bearing members each being disposed at a position of the surface to be scanned with said optical scanning device, for bearing images of different colors to be formed thereon.

In one preferred form of this aspect of the present invention, the apparatus further comprises a printer controller for converting a color signal, inputted from an external equipment, into imagewise data of different colors and for applying the imagewise data to corresponding optical scanning devices, respectively.

In accordance with a ninth aspect of the present invention, there is provided an optical scanning device, comprising: light source means; deflecting means; and optical scanning means; wherein a plurality of light beams from said light source mans are directed to said deflecting means, and the plurality of light beams from said deflecting means are directed to corresponding surfaces, to be scanned, respectively, by said optical scanning means, and wherein said optical scanning means includes a single scanning optical element having an anamorphic surface, and said scanning optical element has, within a main scan sectional plane, one surface which is an aspherical surface.

In one preferred form of this aspect of the present invention, in a sub-scan sectional plane, the plurality of light beams are obliquely incident upon a deflection surface of said deflecting means.

At least one surface of said scanning optical element may have an aspherical surface function with respect to the sub-scan direction.

The scanning optical element may function to direct the plurality of light beams from said deflecting means to the surfaces to be scanned, respectively.

One aspherical surface, in the main scan sectional plane, of said scanning optical element may be the surface placed at the light entrance side.

The aspherical surface shape of the one aspherical surface, in the main scan sectional plane, of said scanning optical element may have no inflection point in the curvature change.

The scanning optical element may be an element made through plastic molding.

The light source means may comprise a multi-beam laser.

Where the power of said scanning optical element in the sub-scan direction is $\varnothing_{so}$ and the power of a light exit surface of said scanning optical element in the sub-scan direction is $\varnothing_{si}$, a relation $0.9 \times \varnothing_{so} \leq \varnothing_{si} \leq 1.1 \times \varnothing_{so}$ may be satisfied.

Where an air-converted distance from said deflecting means to a light exit surface of said scanning optical element along the optical axis is P1, a distance from the light exit surface of said scanning optical element to the surface to be scanned is P2, an air-converted distance from said deflecting means, being out of the axis, to the light exit surface of said scanning optical element is M1, and a distance from the light exit surface of said scanning optical element to the surface to be scanned is M2, the following relation may be satisfied:

$$0.9 \times \frac{P2}{P1} \leq \frac{M2}{M1} \leq 1.1 \times \frac{P2}{P1}$$

Within the sub-scan sectional plane, the light entrance surface of said scanning optical element may have a plane shape.

In accordance with a tenth aspect of the present invention, there is provided an image forming apparatus, comprising: an optical scanning device as recited in relation to the ninth aspect; a photosensitive member disposed at a position of the surface to be scanned as aforesaid; a developing device for developing an electrostatic latent image formed on said photosensitive member with a light beam scanned with said optical scanning device, to produce a toner image; a transfer device for transferring the developed toner image to a transfer material; and a fixing device for fixing the transferred toner image on the transfer material.

In accordance with an eleventh aspect of the present invention, there is provided an image forming apparatus, comprising: an optical scanning device as recited in relation to the ninth aspect; and a printer controller for converting code data, inputted from an external equipment, into an imagewise signal and for applying the imagewise signal to said optical scanning device.

In accordance with a twelfth aspect of the present invention, there is provided a color image forming apparatus, comprising: at least one optical scanning device as recited in relation to the ninth aspect; wherein the or each optical scanning device functions to record imagewise information in relation to corresponding one of photosensitive members, corresponding to different colors, respectively.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 illustrates the sagittal aspherical amount in the first embodiment of the present invention.

FIG. 13 illustrates the sagittal aspherical amount in the second embodiment of the present invention.

DESCRIPTION OF THE PREFERRED EMBODIMENTS

Preferred embodiments of the present invention will now be described with reference to the attached drawings.

[Embodiment 1]

Figure 1A:
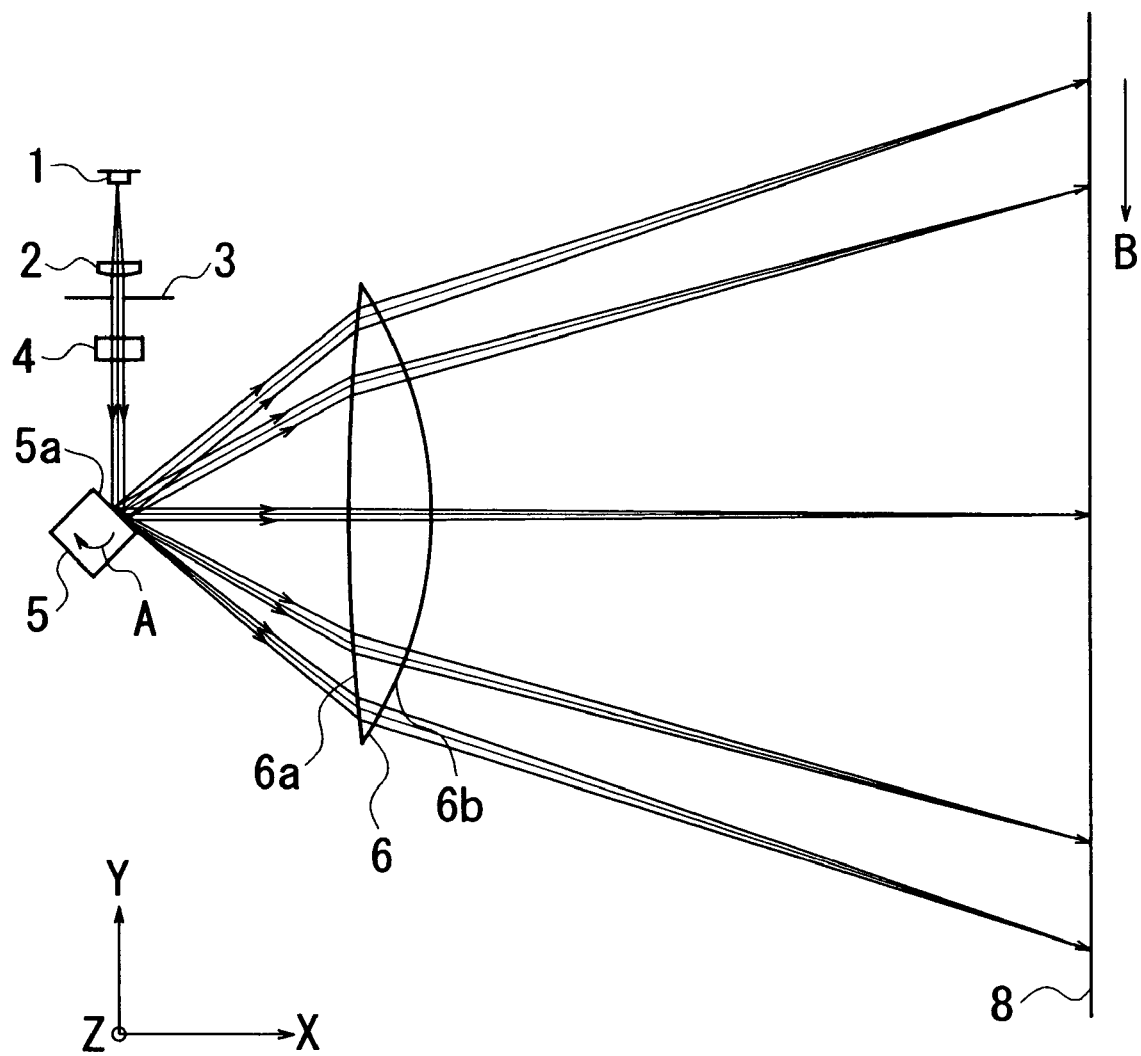
FIG. 1A is a main-scan sectional view in a first embodiment of the present invention.
Figure 1B:
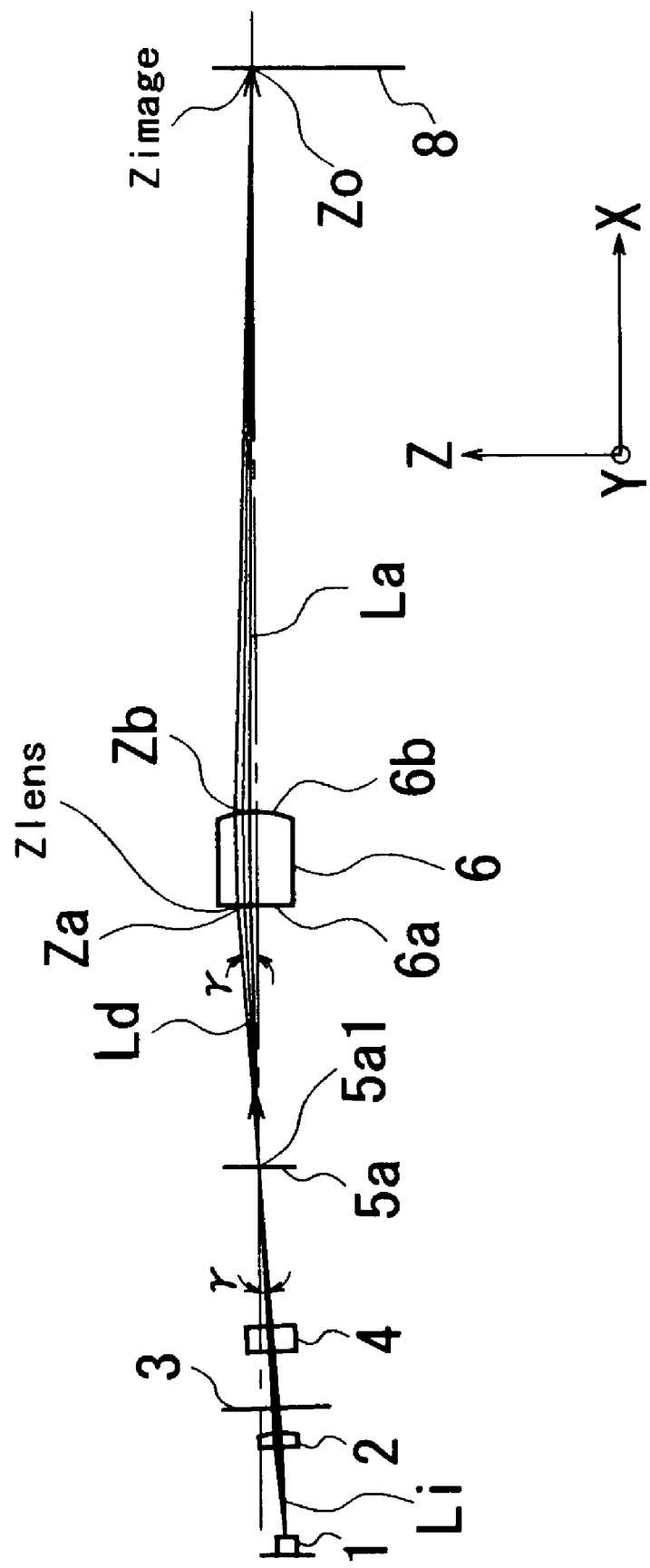
FIG. 1B illustrates a sub-scan sectional view in the first embodiment of the present invention.

FIG. 1A is a sectional view (main-scan sectional view) of a main portion of an optical scanning device in a main scan direction, according to a first embodiment of the present invention. FIG. 1B is a sectional view (sub-scan sectional view) of the main portion of the optical scanning device in the first embodiment.

Here, the term "main scan direction" refers to a direction perpendicular to a rotational axis of deflecting means and an optical axis of a scanning optical element (i.e., a direction in which a light beam is reflectively deflected (deflectively scanned) by the deflecting means). The term "sub-scan" refers to a direction parallel to the rotational axis of the deflecting means. The term "main-scan sectional plane" refers to a plane which contains the optical axis of the scanning optical system. The term "sub-scan sectional plane" refers to a sectional plane perpendicular to the main-scan sectional plane.

In FIGS. 1A and 1B, denoted at 1 is a semiconductor laser which is light source means. One or more divergent lights from the semiconductor laser 1 are transformed by a collimator lens 2 into parallel light beams or approximately parallel light beams, which may be convergent beams or divergent beams). Subsequently, a stop 3 restricts the beam diameter to provide a desired spot diameter. Denoted at 4 is a cylindrical lens having a refractive power only in the sub-scan direction. If functions to image the light, adjacent a deflection surface 5a of deflecting means 5 (to be described later), as a linear image extending in a direction parallel to the main-scan sectional plane. Denoted at 5 is said deflecting means which comprises a polygon mirror (rotational polygonal mirror) having four faces, for example (it may have more than four faces). The polygon mirror 5 rotates in a direction of an arrow A, at a constant speed.

Denoted at 6 is a scanning optical system which comprises a single scanning optical element (f-θ lens) having an f-θ characteristic. If functions to image the deflected light beam, reflectively deflected by the deflecting means 5, upon the surface of a photosensitive drum (photosensitive member) 8 which is the surface to be scanned. Also, it serves to correct the surface tilt of the deflection surface 5a of the deflecting means 5. Hereinafter, the scanning optical system 6 will be referred to also as a scanning optical element. More specifically, the deflected light beam reflectively deflected by the deflection surface 5a of the deflecting means 5 is directed through the scanning optical system 6 onto the photosensitive drum surface 8. By rotating the polygon mirror 5 in the direction of an arrow A, the photosensitive drum surface 8 is optically scanning in the direction of an arrow B. In this manner, scan lines are defined on the photosensitive drum surface, whereby imagewise recording is carried out.

As shown in FIG. 1B, in the first embodiment, the light beam emitted from the light source means 1 is projected upon the deflection surface 5a, from obliquely below at an angle γ with respect to the sub-scan direction, and the light is incident on the scanning optical element 6 which is single element made of glass or synthetic resin. The scanning optical element 6 serves to image the deflected light beam upon the surface 8 to be scanned, as a spot.

Table 1 below shows optical disposition of optical components in the first embodiment.

TABLE 1

| SURFACE | SPACING | POSITION |
| --- | --- | --- |
| POLYGON DEFLECTION SURFACE | 51.45 mm | 0.00 mm |
| F-θ LENS ENTRANCE SURFACE | 17.90 mm | 51.45 mm |
| F-θ LENS EXIT SURFACE | 147.28 mm | 69.35 mm |
| SURFACE TO BE SCANNED | | 216.63 mm |

Table 2 below shows the shapes of the entrance surface and exit surface of the scanning optical element 6 in the first embodiment.

TABLE 2

STRUCTURE OF OPTICAL SCANNING DEVICE

| f-θ COEFF., SCAN WIDTH, ANGLE OF VIEW | | | | f-θ LENS 6 MERIDIONAL SHAPE | | | f-θ LENS 6 SAGITTAL SHAPE | | |
|---|---|---|---|---|---|---|---|---|---|
| | | | | ENTRANCE SURFACE 6a LIGHT SOURCE SIDE | EXIT SURFACE 6b LIGHT SOURCE SIDE | | ENTRANCE SURFACE 6a LIGHT SOURCE SIDE | EXIT SURFACE 6b LIGHT SOURCE SIDE | |
| f-θ COEFF. | k (mm/rad) | 150 | R | 4.27400E+00 | −9.47135E+01 | Rs | infinite | −2.39398E+01 | |
| SCAN WIDTH | W (mm) | 214 | K | 3.71366E+00 | 0.00000E+00 | D2 | 0.00000E+00 | 6.66434E−05 | |
| MAXIMUM ANGLE OF VIEW | θ (deg) | 40.87 | B4 | −1.85091E−07 | 0.00000E+00 | D4 | 0.00000E+00 | −3.17434E−09 | |
| WAVELENGTH, REFRACTIVITY | | | B6 | 3.44576E−11 | 0.00000E+00 | D6 | 0.00000E+00 | 1.59261E−12 | |
| USED WAVELENGTH | λ (nm) | 780 | B8 | −6.82420E−15 | 0.00000E+00 | D8 | 0.00000E+00 | 3.96966E−16 | |
| f-θ LENS 6 REFRACTIVITY | N1 | 1.5242 | B10 | 7.10650E−19 | 0.00000E+00 | D10 | 0.00000E+00 | −1.69618E−19 | |
| DISPOSITION OF SCANNING OPTICAL SYSTEM | | | | REMOTE FROM LIGHT SOURCE | REMOTE FROM LIGHT SOURCE | | REMOTE FROM LIGHT SOURCE | REMOTE FROM LIGHT SOURCE | |
| POLYGON DEFLECTION SURFACE 5a - LENS ENTRANCE SURFACE 6a | d1 (mm) | 51.45 | R | 4.27400E+00 | −9.47135E+01 | Rs | infinite | −2.39398E+01 | |
| LENS ENTRANCE SURFACE 6a - LENS EXIT SURFACE 6b | d2 (mm) | 17.90 | K | 3.71366E+00 | 0.00000E+00 | D2 | 0.00000E+00 | 5.78933E−05 | |
| LENS EXIT SURFACE 6b - SURFACE TO BE SCANNED 7 | d3 (mm) | 147.28 | B4 | −1.85091E−07 | 0.00000E+00 | D4 | 0.00000E+00 | 8.18004E−09 | |
| POLYGON DEFLECTION SURFACE 5a - SURFACE TO BE SCANNED 7 | d total | 216.63 | B6 | 3.44576E−11 | 0.00000E+00 | D6 | 0.00000E+00 | −3.52025E−12 | |
| INCIDENCE ANGLE (INCIDENCE OPTICAL SYSTEM) | | | B8 | −6.82420E−15 | 0.00000E+00 | D8 | 0.00000E+00 | 9.96005E−16 | |
| INCIDENCE ANGLE IN MAIN SCAN DIRECTION | α (deg) | 90.00 | | | | | | | |
| INCIDENCE ANGLE IN SUB-SCAN DIRECTION | γ (deg) | 3.00 | B10 | 7.10650E−19 | 0.00000E+00 | D10 | 0.00000E+00 | −8.18804E−20 | |

| f-θ COEFF., SCAN WIDTH, ANGLE OF VIEW | | | | f-θ LENS 6 SAGITTAL ASPHERICAL SHAPE | |
|---|---|---|---|---|---|
| | | | | ENTRANCE SURFACE 6a | EXIT SURFACE 6b |
| f-θ COEFF. | k (mm/rad) | 150 | | LEFT & RIGHT, THE SAME | LEFT & RIGHT, THE SAME |
| SCAN WIDTH | W (mm) | 214 | | | |
| MAXIMUM ANGLE OF VIEW | θ (deg) | 40.87 | C1 | 0.00000E+00 | 0.00000E+00 |
| WAVELENGTH, REFRACTIVITY | | | C2 | 0.00000E+00 | 4.30290E−10 |
| USED WAVELENGTH | λ (nm) | 780 | C3 | 0.00000E+00 | −9.41947E−14 |

Figure 2:
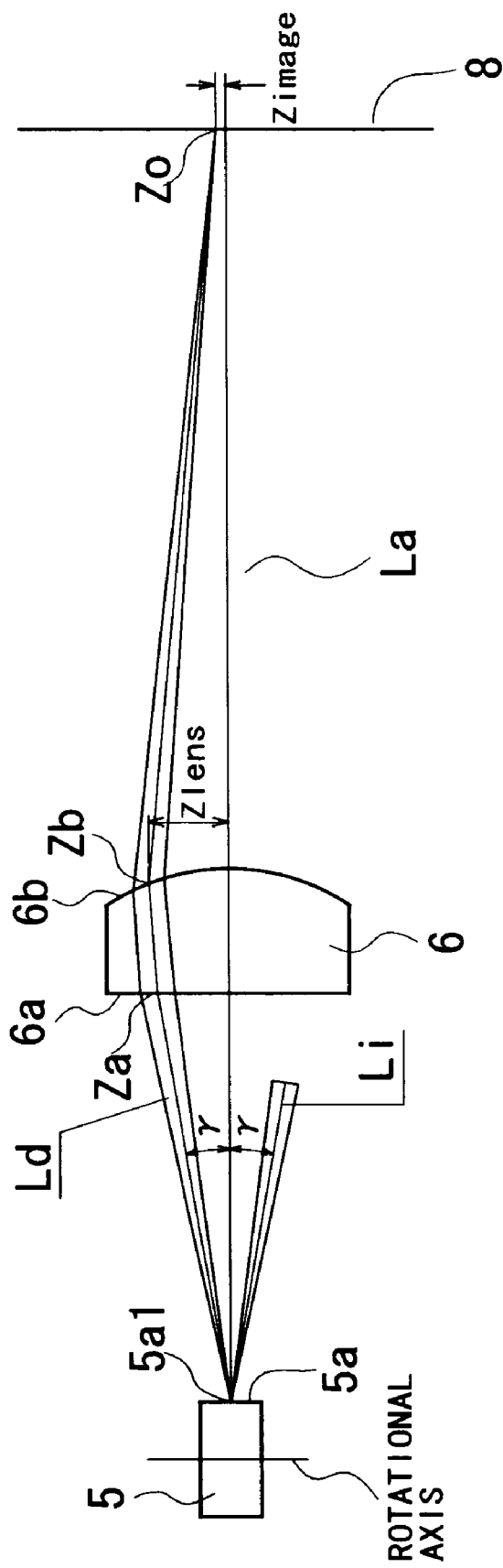
FIG. 2 is a schematic view of a main portion along the sub-scan direction, in the first embodiment of the present invention.

FIG. 2 is a sub-scan sectional view in which the optical path of the optical system of the optical scanning device according to the first embodiment is exploded.

As shown in FIGS. 1B and 2, in the first embodiment, the light beam emitted from the light source means 1 is projected upon the deflection surface 5a from obliquely below, at an angle γ with respect to the sub-scan direction, and the light is incident on the scanning optical element 6 which is single element made of glass or synthetic resin. The scanning optical element 6 has an anamorphic surface and serves to image the deflected light beam upon the surface 8 to be scanned, as a spot or substantially as a spot.

Figure 6:
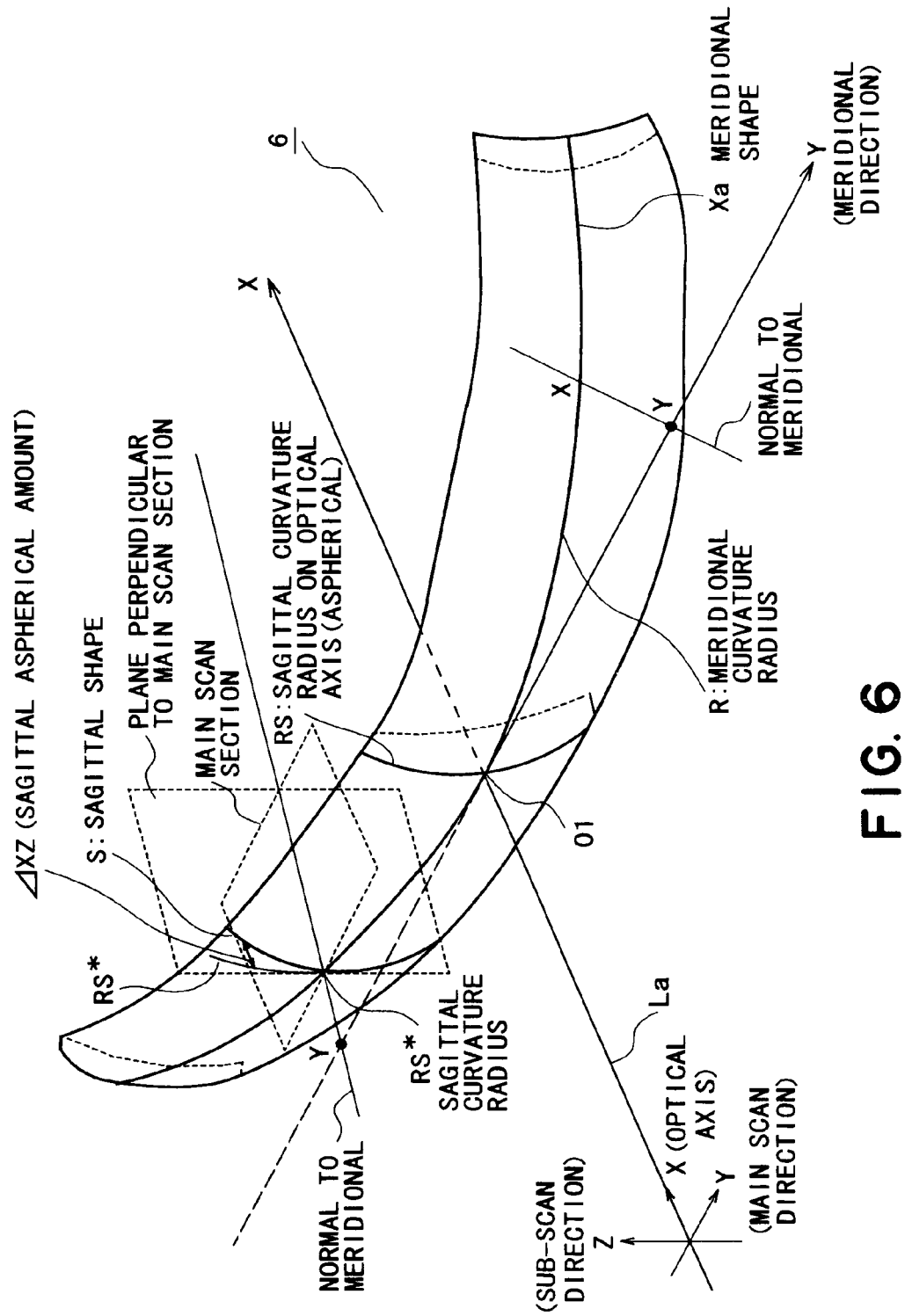
FIG. 6 is a schematic view for explaining the surface details in the first embodiment of the present invention.

FIG. 6 illustrates the notion of the scanning optical element 6 used in the first embodiment.

The shape of meridional of each of the light entrance surface 6a and light exit surface 6b of the scanning optical element 6 is defined by an aspherical surface shape as can be expressed by a function up to 10th order. For example, as shown in FIG. 6, it is assumed that the point of intersection between the scanning optical element 6 and the optical axis La is taken as an origin O1, the optical axis direction is taken as an X axis, the axis being orthogonal to the optical axis La within the main-scan sectional plane (X-Y plane) is taken as a Y axis, and a direction orthogonal to the X-Y plane is taken as a Z axis. In that occasion, the shape of meridional Xa in the meridional direction corresponding to the main scan direction (Y direction) can be expressed by the following equation:

$$Xa = \frac{\frac{Y^2}{R}}{1 + \sqrt{1 - (1+k)\left(\frac{Y}{R}\right)^2}} + B4 \times Y^4 + B6 \times Y^6 + B8 \times Y^8 + B10 \times Y^{10} \tag{a}$$

where R is the curvature radius of meridional, and K, B4, B6, B8, B10, B12, B14 and B16 are aspherical coefficients.

Also, the shape of sagittal S in the sagittal direction corresponding to the sub-scan direction ca be expressed by the following equation:

$$S = \frac{\frac{Z^2}{Rs'}}{1 + \sqrt{1 - \left(\frac{Z}{Rs'}\right)^2}} \quad (b)$$

where S is the sagittal shape as defined within a plane which contains a normal to the meridional at each position Y in the meridional direction and which is perpendicular to the main-scan sectional plane (X-Y plane).

Here, the curvature radius (sagittal curvature radius) Rs* in the sub-scan direction at a position Y which is spaced from the optical axis La by a distance Y and in the main-scan direction, can be expressed by the following equation:

$$Rs^* = Rs \times (1 + D2 \times Y^2 + D4 \times Y^4 + D6 \times Y^6 + D8 \times Y^8 + D10 \times Y^{10})$$

where Rs is the sagittal curvature radius on the optical axis La, and D2, D4, D6, D8 and D10 are sagittal change coefficients. It is the surface wherein the following value X is added to equation (a) above, as an aspherical component in the sagittal direction:

$$X = (C1 + C2Y^2 + C3Y^4)Z^4$$

Although in the first embodiment the surface shape is defined by equations mentioned above, the present invention is not limited to use of the aforementioned equations, but any other equation that can describe the aspherical components in the sagittal direction may be used.

Further, each surface of the scanning optical element 6 in the first embodiment does not provide shift or tilt in the sub-scan direction. The position 5a1 where the deflected light beam to be directed toward an end portion of the surface 8 to be scanned is reflectively deflected by the deflection surface 5a of the polygon mirror 5, is set at the same height as the optical axis La of the scanning optical element 6.

As shown in Table 2, the entrance surface 6a of the scanning optical system 6 comprises a cylindrical surface having a power only in the main scan direction, wherein the shape of meridional is aspherical surface shape (non-arcuate shape) while the shape of sagittal is plane (straight line). The exit surface 6b of the scanning optical system 6 comprises a sagittal curvature radius changing surface wherein the shape of meridional is arcuate while the shape of sagittal is that, along the meridional direction, the curvature radius continuously changes as becoming apart from the optical axis. Also, the exist surface is defined by a sagittal curvature radius changing surface wherein it has an arcuate shape on the optical axis but has an aspherical surface shape (non-arcuate shape) at a portion off the optical axis and wherein, along the meridional direction, the aspherical amount changes as becoming apart from the optical axis.

Further, as regards the aspherical shape of the aspherical surface of the scanning optical element 6 within the main-scan sectional plane, it is defined by a shape having no inflection point in the curvature change.

Next, the schematic view of FIG. 2 for the optical scanning device of the first embodiment, with respect to the sub-scan direction, will be explained.

In the first embodiment, a light beam Li emitted from the light source means 1 is incident upon the deflection surface 5a of the deflecting means 5, with an angle γ=3(deg) in the sub-scan direction, with respect to the main-scan sectional plane. Also, the deflected light beam Ld reflected by the deflection surface 5a is incident upon the scanning optical element 6, with an angle γ=3(deg) in the sub-scan direction, with respect to the main-scan sectional plane. Therefore, the position where a principal ray (dash-and-dot line) of the deflected light beam Ld arrives at and passes the entrance surface 6a and exit surface 6b is wide apart from the sagittal optical axis (or meridional) La. The passing positions Za and Zb upon the lens surfaces and the distance $Z_{lens}$ from the optical axis La are above the meridional position ($Z_{lens}=0$), and thus it means $Z_{lens} >> 0$.

In the first embodiment, the distance $Z_{lens}$ of the position Za in the sub-scan direction where the deflected light beam Ld impinges on the entrance surface 6a of the scanning optical element 6 is $Z_{lens}=2.73$ mm, while the distance $Z_{lens}$ of the position Zb where the light arrives at the exit surface 6b is $Z_{lens}=3.34$ mm.

The deflected light beam Ld passed through the scanning optical element 6 is imaged upon the surface 8 to be scanned, as a spot, by means of the light collecting function of the scanning optical element 6.

As described, where the principal ray of the deflected light beam Ld passes a position away from the meridional (or sagittal optical axis) La, the light beam passed through the scanning optical element 6 is deflected downwardly by means of the power (refractive power) of the lens.

In that occasion, if the structure setting of the scanning optical system 6 is inappropriate, the light intersects with the optical axis La before it reaches the surface 8 to be scanned, such that, upon the surface 8 to be scanned, it impinges on a position below the main-scan sectional plane. Here, the position in the sub-scan direction where the deflected light beam Ld impinges on the surface 8 to be scanned, will be referred to as "irradiated position Zo", while the distance from the optical axis La will be referred to as "$Z_{image}$".

Here, the position in the sub-scan direction of the deflected light beam Ld impinging on the entrance surface 6a and exit surface 6b of the scanning optical system 6 as well as the power (refractive power) being influential to deflect the deflected light beam Ld downwardly, are different with the image height. Because of this, there arises a problem that the distance $Z_{image}$ of the irradiated position Zo does not become even, such that what is called "scan line bending" results therefrom.

In order to solve this problem, in the optical scanning device according to the first embodiment, the exit surface 6b of the scanning optical element 6 which is a single element constituting the scanning optical system, is provided by a sagittal aspherical amount changing surface as defined by the sagittal shape S of aforementioned equation (b) and the numerical values of FIG. 6. Here, the term "sagittal aspherical amount changing surface" refers to a surface in which, along the meridional direction of the lens surface, the aspherical amount ΔXz of sagittal changes as becoming apart from the optical axis La of the lens surface.

Here, the term "sagittal aspherical amount ΔXz" refers to the amount ΔXz, as shown in FIG. 6, through which, at a certain position $Z_{lens}$ ($Z_{lens} \neq 0$ mm) in the sub-scan direction other than upon the meridional (other than on the sagittal optical axis), the lens surface displaces from the base sagittal curvature radius Rs*. The recitation "the sagittal aspherical amount ΔXz changes" means that the sagittal aspherical amount ΔXz at the same position $Z_{lens}$ ($Z_{lens} \neq 0$ mm) in the sub-scan direction changes with the position Y in the meridional direction. Namely, it means a state dΔXz/dY≠0.

Figure 4:
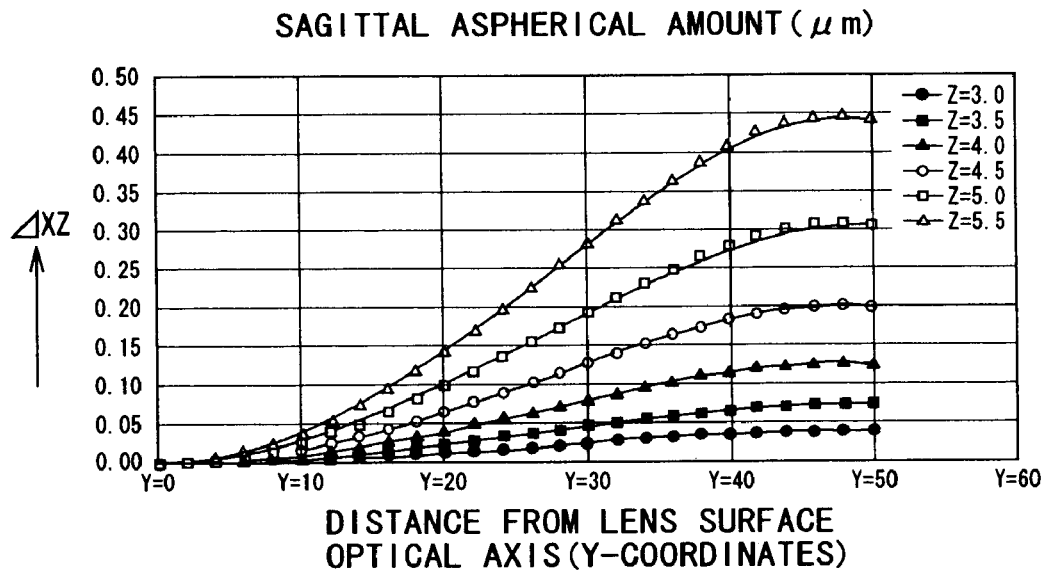
FIG. 4 illustrates the sagittal aspherical amount in the first embodiment of the present invention.
Figure 5:
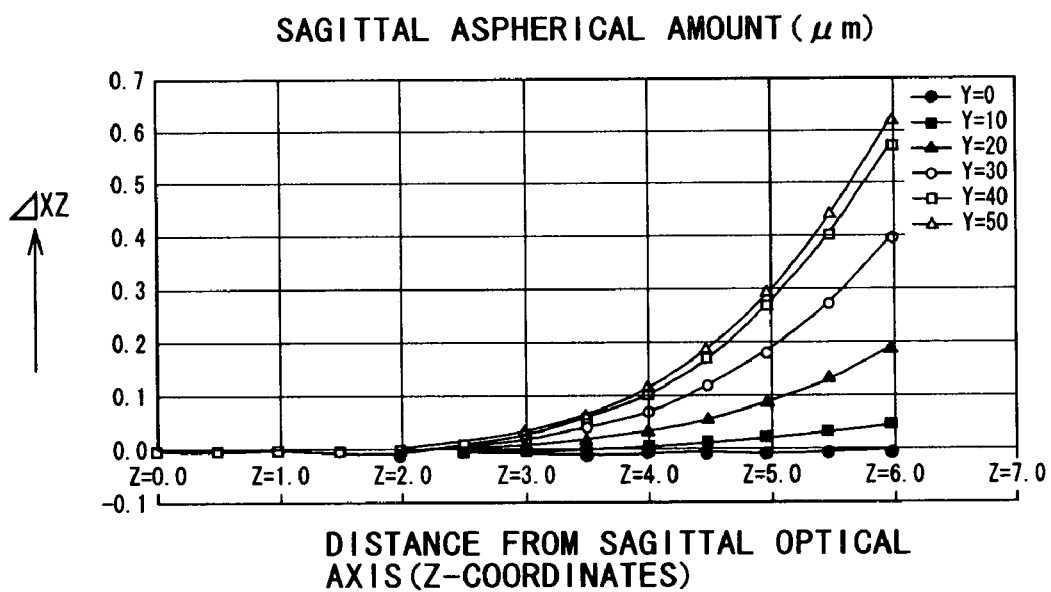
FIG. 5 illustrates the sagittal aspherical amount in the first embodiment of the present invention.
Figure 7:
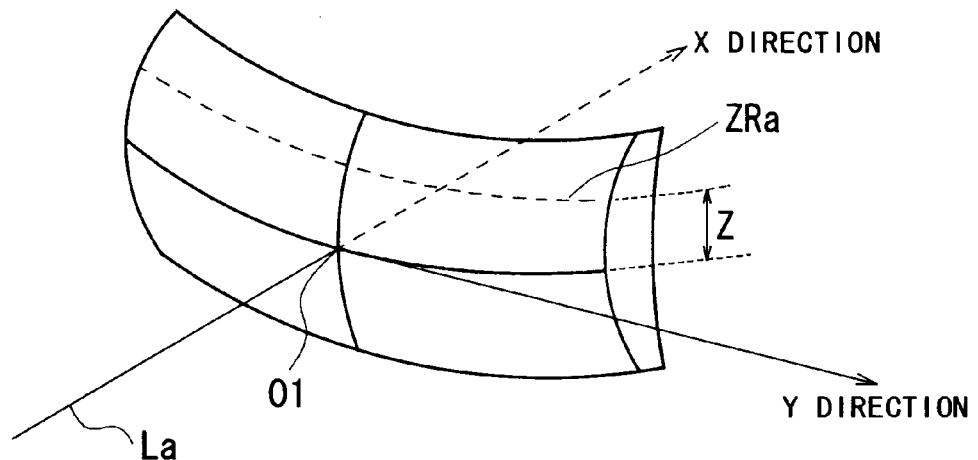
FIG. 7 is a schematic view for explaining a change in the sagittal aspherical amount of the surface, in the first embodiment of the present invention.
Figure 8:
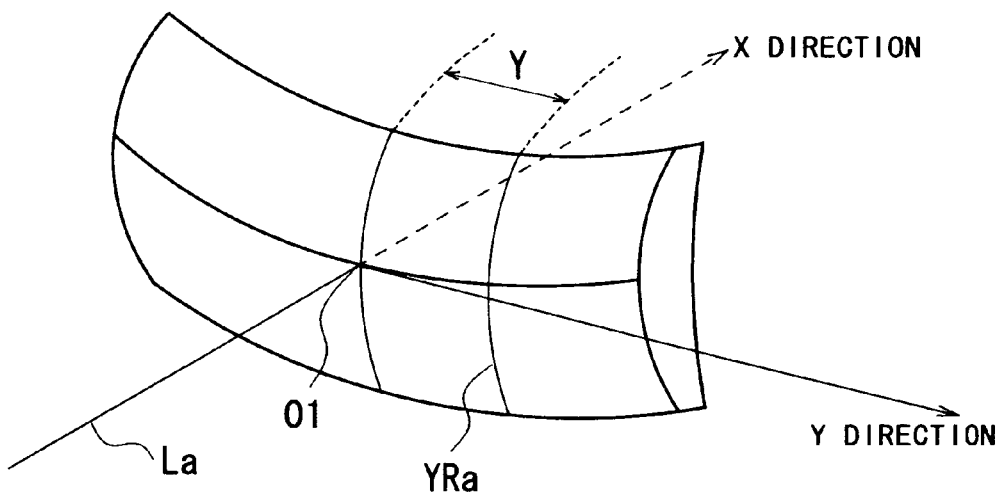
FIG. 8 is a schematic view for explaining a change in the sagittal aspherical amount of the surface, in the first embodiment of the present invention.

FIG. 3 shows how the sagittal aspherical amount ΔXz of the exit surface 6b of the scanning optical element 6, in the first embodiment, changes. FIG. 4 illustrates how the sagittal aspherical amount ΔXz at a distance Z from the sagittal optical axis changes along the meridional direction (Y value), that is, the sagittal aspherical amount ΔXz at the position ZRa in FIG. 7. FIG. 5 illustrates how the sagittal aspherical amount ΔXz at a distance Y along the meridional direction from the optical axis La of the exit surface 6b, changes in the sub-scan direction (Z direction), that is, the sagittal aspherical amount ΔXz at the position YRa in FIG. 8.

In the first embodiment, the sagittal shape of the exit surface 6b on the optical axis La is made arcuate and, in a portion apart from the optical axis La in the meridional direction, the sagittal shape is made non-arcuate (aspherical). Furthermore, as shown in FIG. 4, the exit surface 6b is defined as such sagittal aspherical amount changing surface that: in the meridional direction, the aspherical amount ΔXz of sagittal gradually increases from zero as becoming apart from the optical axis La and, after a peak value in the course, it gradually decreases.

Also, as shown in FIG. 5, the sagittal aspherical amount is so added that, in a portion of the exit surface 6b off the optical axis La, it gradually increases as becoming apart from the sagittal optical axis La in the sub-scan direction. Here, positive sign means displacement from the base arcuate shape toward the surface to be scanned.

The sagittal aspherical amount changing surface is such that, as becoming apart from the optical axis La on the exit surface 6b in the meridional direction, the sagittal aspherical power gradually decreases from zero and, in a portion of the exit surface 6b off the optical axis La, the sagittal aspherical power gradually decreases as becoming apart from the sagittal optical axis La in the sub-scan direction.

Further, the sagittal aspherical power being added is a very small power, as being about $1/100$ of the base arcuate shape, and the sagittal aspherical surface is effective only to correction of scan line bending, without substantial contribution to field curvature in the sub-scan direction.

Figure 9A:
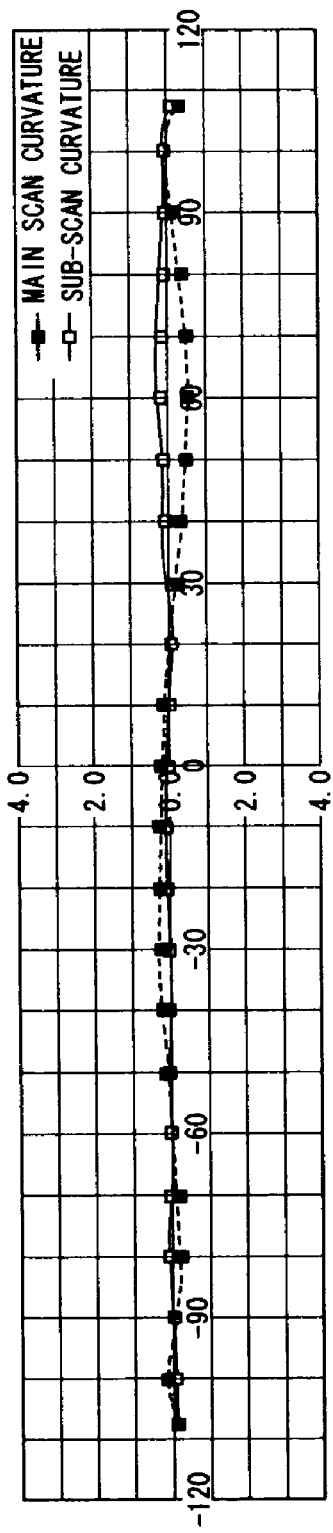
FIGS. 9A and 9B are graphs, respectively, for explaining aberrations in the first embodiment of the present invention.
Figure 9B:
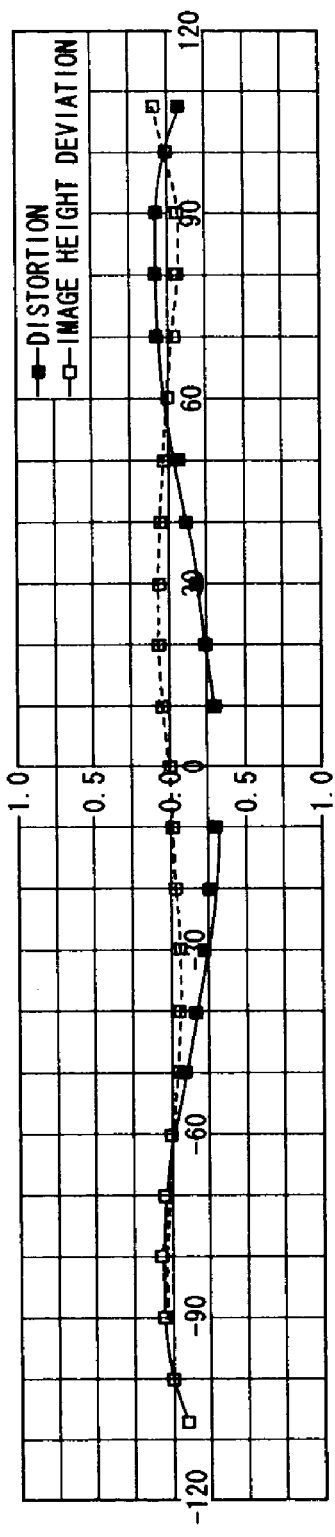

FIGS. 9A and 9B show aberrations in the first embodiment.

The curvature of field in the main scan direction is within a range of ±0.6 mm, and the field curvature in the sub-scan direction is within a range of ±0.3 mm. Thus, they are well corrected. Also, distortion aberration (f-θ characteristic) is within a range of ±0.3% and image height deviation is within a range of +0.08 mm, and they are well corrected.

Thus, separately from correction of the field curvature in the sub-scan direction on the basis of the light collecting function as provided by the base arcuate shape, controlling the irradiated position on the surface to be scanned, through the aspherical effect thereof, is enabled. Due to its aspherical surface effect, the irradiated position $Z_{oa}$ of the deflected light, being directed to different image heights, can be made even in registration with the irradiated position Zo at the center image height. Namely, the field curvature in the sub-scan direction and the scan line bending can be corrected independently of each other. Regarding registration, more specifically, it is accomplished with a positional deviation in the sub-scan direction of not greater than 10 μm, preferably, not greater than 5 μm.

Figure 10A:
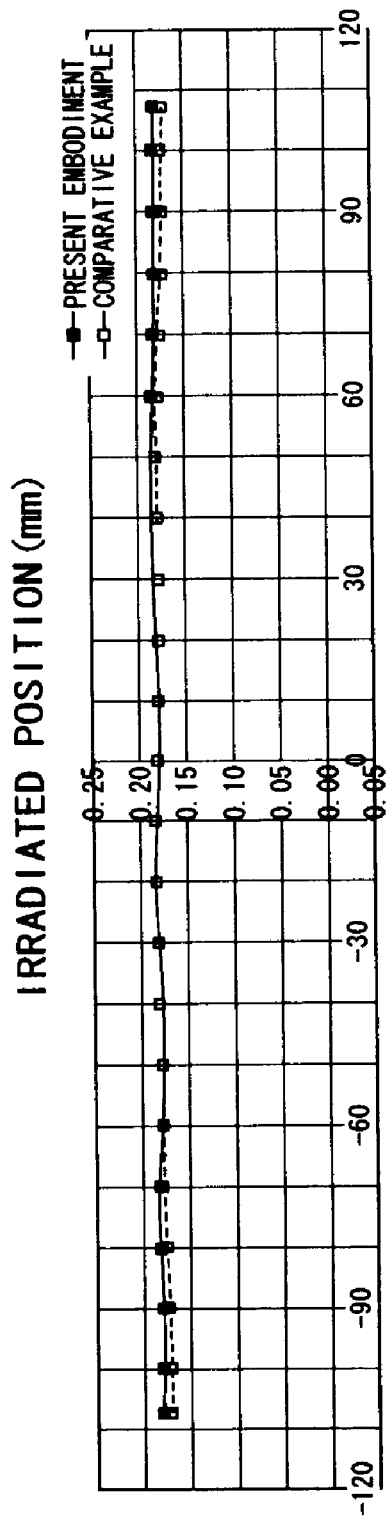
FIGS. 10A and 10B are graphs, respectively, for explaining the irradiated position and the scan line bending, in the first embodiment of the present invention.
Figure 10B:
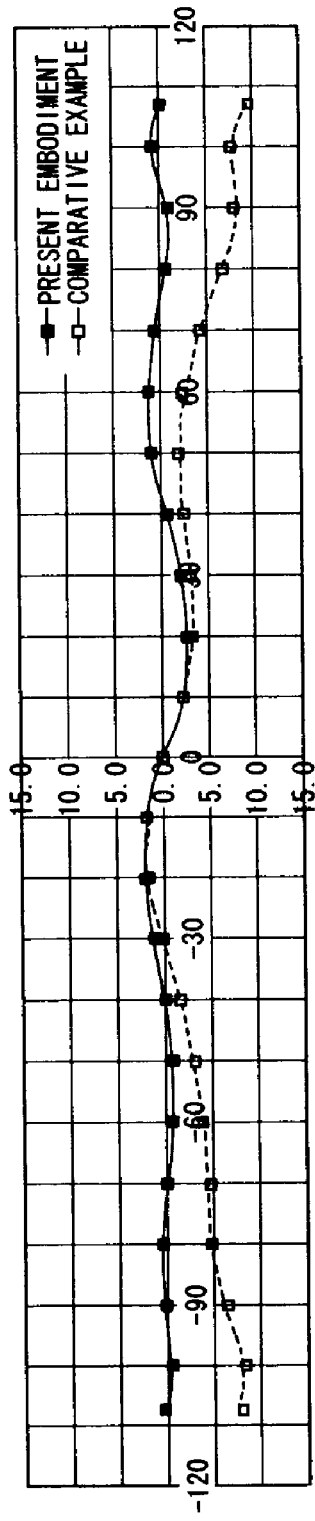

FIGS. 10A and 10B show the irradiated position and scan line bending in an optical scanning device according to the first embodiment, in comparison with those of a comparative example. The optical scanning device of the comparative example had a scanning optical system without the aspherical surface effect of the first embodiment. The scan line bending is defined by deviations in the irradiated position between the center image height and other image heights.

As seen from FIGS. 10A and 10B, the irradiated position at the center image height corresponding to the optical axis of the scanning optical system 6 is, in both of the first embodiment and the comparative example, $Z_{image}$=0.1819 mm, and this position is above the sagittal optical axis.

In the comparative example, as compared with the center image height, the irradiated position at an end portion image height is displaced downwardly, and scan line bending of 11 μm is produced. In the first embodiment as compared therewith, the irradiated positions at different image heights are made even, and scan line bending is corrected to a sufficiently small amount of 5.0 μm.

It is seen from the above that, by changing the sagittal aspherical amount ΔXz as becoming apart from the optical axis La in the meridional direction, the irradiated position at each image height can be made even and the scan line bending can be improved remarkably.

Further, in the optical scanning device according to the first embodiment, since the irradiated position Zo upon the surface 8 to be scanned is made closer to the sagittal optical axis La as compared with the position Za or Zb, in the sub-scan direction, where the deflected light beam Ld reaches the entrance surface 6a or exit surface 6b of the scanning optical system 6, the scan line bending can be corrected more satisfactorily.

Next, single scanning optical element 6 which constitutes the scanning optical system of the first embodiment will be described. The entrance surface 6a is a cylindrical surface having a power only in the main scan direction. The exit surface 6b is a sagittal curvature radius changing surface wherein the meridional has an arcuate shape while the sagittal has a convex shape and wherein the absolute value of the curvature radius gradually increases as becoming apart from the optical axis in the meridional direction. Further, on both left and right sides of the main scan direction, sandwiching the optical axis of the scanning optical system 6, the sagittal curvature radius changes asymmetrically. As described above, the total power (refractive power) of the scanning optical system 6 in the sub-scan direction is concentrated to the exit surface 6b.

More specifically, 90% or more of the total power is concentrated. Namely, where the power of the scanning optical system 6 in the sub-scan direction is $ø_{so}$ and the power of the sagittal aspherical amount changing surface in the sub-scan direction is $ø_{si}$, the structure is arranged to satisfy the following relation:

$$0.9 \times ø_{so} \leq ø_{si} \leq 1.1 \times ø_{so}$$

Figure 11:
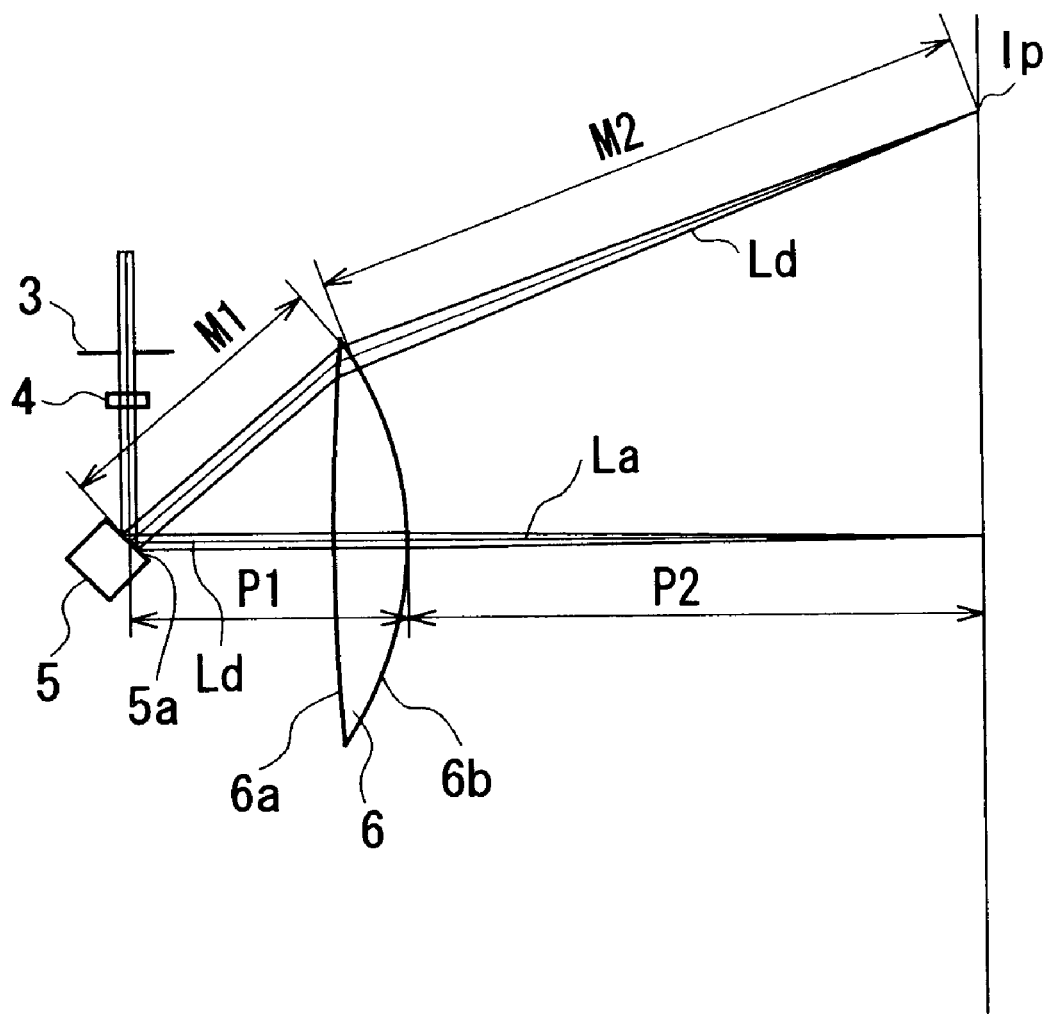
FIG. 11 is a schematic view for explaining the meridional shape in the first embodiment of the present invention.

FIG. 11 is a schematic view of a main portion of the first embodiment in the main scan direction.

The meridional shape of the exit surface 6b shown in FIG. 11 is arcuate, with such shape that: if the distance, along the optical axis of the scanning optical system 6, from the position in the main scan direction where the deflected light beam is deflected by the deflection surface 5a to the position where the deflected light beam reaches the exit surface 6b is P1 and the distance from the position where the deflected light beam reaches the exit surface 6b to the position where it impinges on the surface 8 to be scanned is P2, in regard to light paths of deflected light beams directed to all the image heights on the surface 8 to be scanned the ratio P2/P1 between them becomes approximately constant (P2/P1=Const) or, alternatively, it becomes within a range of ±10% from a certain value. For example, in regard to the case of the light path for a deflected light beam Ld being directed to an end portion Ip of the image height, if the distance from the position where the deflected light beam Ld is reflected by the deflection surface 5a to the position where the deflected light beam Ld reaches the exit surface 6b is M1 and the distance from the position where the deflected light beam Ld reaches the exit surface 6b to the position where it reaches the surface 8 to be scanned is M2, the meridional shape is so determined that the ratio M2/M1 between them becomes approximately equal to P2/P1 (M2/M1≈P2/P1, more specifically, to be within the range of ±10%). Namely, it is determined to satisfy:

$$0.9 \times \frac{P2}{P1} \le \frac{M2}{M1} \le 1.1 \times \frac{P2}{P1}$$

Although in the first embodiment the total power (refractive power) of the scanning optical system 6 in the sub-scan direction is concentrated to the exit surface 6b, both of making the field curvature in the sub-scan direction even through the meridional shape described hereinbefore and making the lateral magnification (sub-scan magnification) βs in the sub-scan direction even at an approximately constant value can be accomplished consistently. The sub-scan magnification of the scanning optical system 6 in the first embodiment is βs=−2.31×.

With this arrangement, even if the scanning optical element 6 is shifted or tilted in the sub-scan direction due to a manufacturing error or assembling error, for example, to produce eccentricity in the sub-scan direction, the design (initial) performance in regard to scan line bending can be maintained.

Namely, in accordance with the optical scanning device of the first embodiment, scan line bending can be corrected satisfactorily throughout the whole image height on the surface 8 to be scanned, and additionally, even if there occurs any eccentricity of the scanning optical element 6 in the sub-scan direction, superior scan line bending performance can be held constantly. Therefore, the first embodiment provides an optical scanning device by which scan line bending can be corrected stably and high-quality images are obtained constantly.

The first embodiment concerns an example in which a light beam emitted from light source means 1 is projected upon the deflecting means at an oblique incidence angle γ with respect to the main-scan sectional plane and in which the position where a deflected light beam to be directed to an end portion of the surface 8 to be scanned is reflectively deflected by the deflecting surface 5a of the polygon mirror 5 is made at the same level as the optical axis of the scanning optical system 6. However, the invention is not limited to this example. As an alternative example, the positions where the deflected light beam to be directed to all the image heights is reflectively deflected by the deflecting surface 5a may be defined above the optical axis.

Advantageous results of the present invention are still well available in that occasion.

Further, although the first embodiment concerns an optical scanning device in which a single light beam is optically scanned, the invention is not limited to it. Substantially the same advantageous effects are attainable in a multi-beam type optical scanning device in which two, three, four or more light beams are optically scanned simultaneously.

Furthermore, although the first embodiment relates to an example wherein the scanning optical system is provided by a single scanning optical element, the invention is not limited to it. The scanning optical system may comprise plural optical components such as scanning optical elements or imaging mirrors. At least one surface of such scanning optical elements may be made into a sagittal aspherical amount changing surface and, by which, scan line bending can be corrected satisfactorily.

It should be noted that in the first embodiment the entrance surface and/or the exit surface of the scanning optical element may be formed with diffraction means to provide a similar aspherical surface function as described hereinbefore.

[Embodiment 2]

Figure 12A:
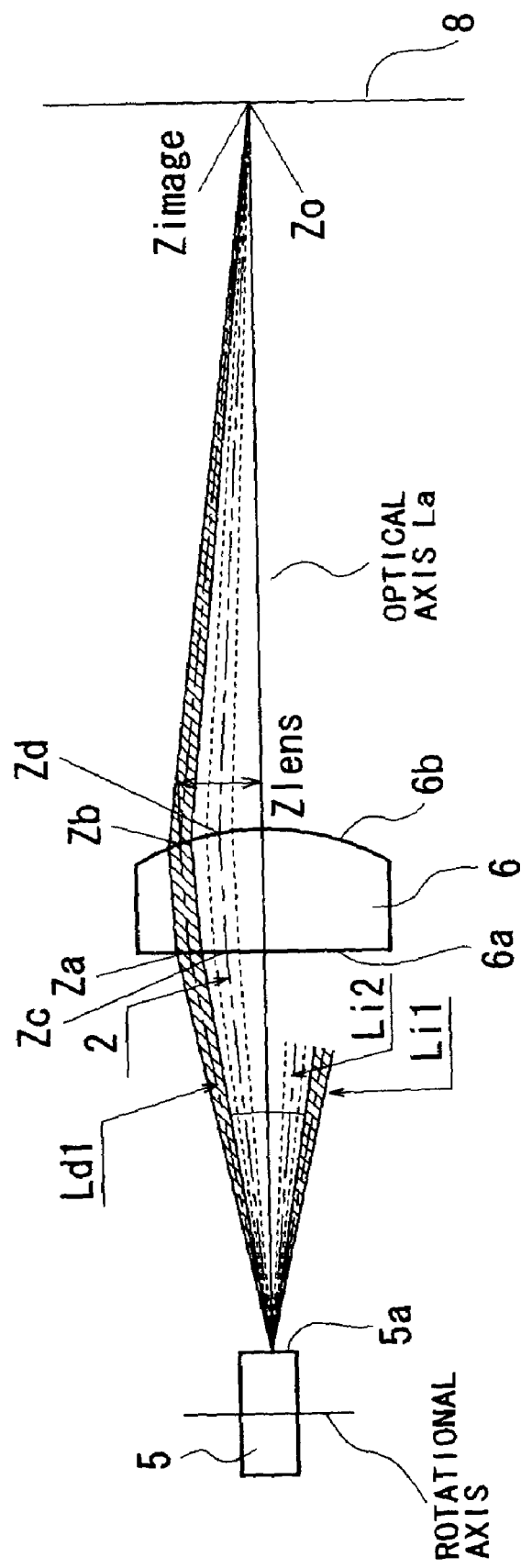
FIG. 12A is a schematic view of a main portion along the sub-scan direction, in a second embodiment of the present invention.
Figure 12B:
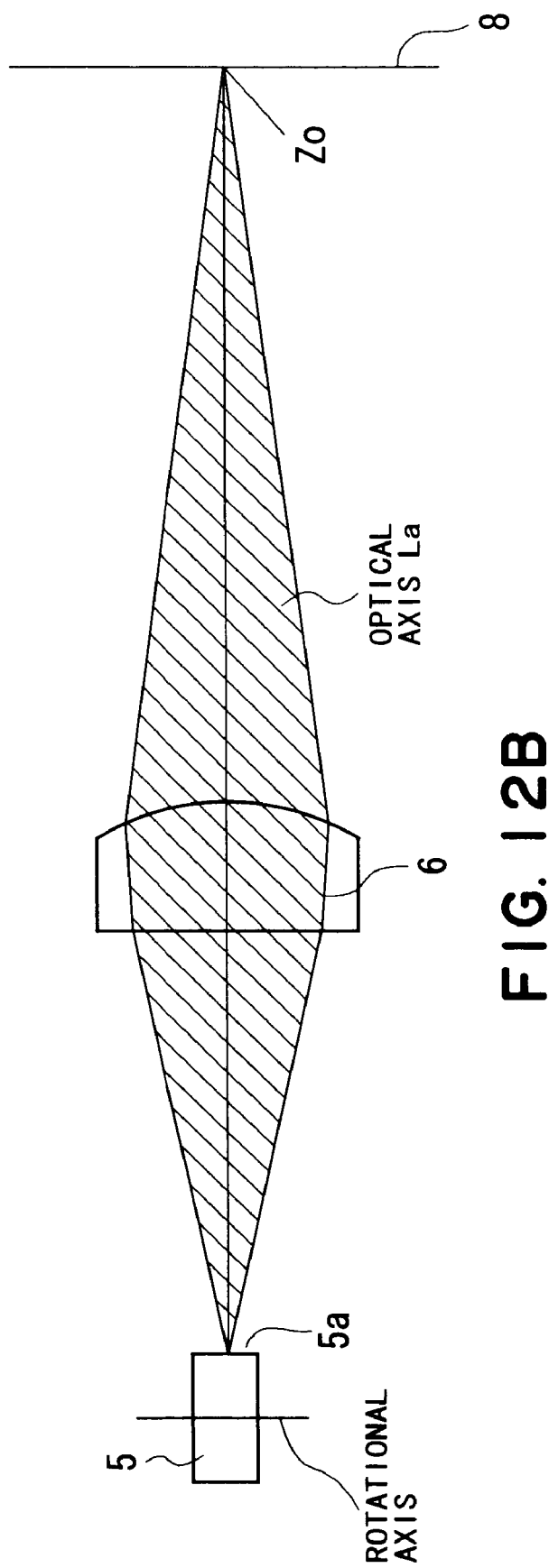
FIG. 12B is a schematic view of a main portion along the sub-scan direction, in a second embodiment of the present invention.

FIGS. 12A and 12B are schematic views, respectively, along a sub-scan sectional plane of an optical scanning device according to a second embodiment of the present invention.

The second embodiment differs from the first embodiment in that the sagittal aspherical amount of the exit surface 6b of the scanning optical element 6 is changed.

Table 3 below shows the shapes of the entrance surface 6a and exit surface 6b of the scanning optical element 6 in the second embodiment.

TABLE 3

| STRUCTURE OF OPTICAL SCANNING DEVICE | | | | | | | | |
|---|---|---|---|---|---|---|---|---|
| f-θ COEFF., SCAN WIDTH, ANGLE OF VIEW | | | | f-θ LENS 6 MERIDIONAL SHAPE | | f-θ LENS 6 SAGITTAL SHAPE | | |
| | | | | ENTRANCE SURFACE 6a | EXIT SURFACE 6b | | ENTRANCE SURFACE 6a | EXIT SURFACE 6b |
| f-θ COEFF. | k (mm/rad) | 150 | | LIGHT SOURCE SIDE | LIGHT SOURCE SIDE | | LIGHT SOURCE SIDE | LIGHT SOURCE SIDE |
| SCAN WIDTH | W (mm) | 214 | | | | | | |
| MAXIMUM ANGLE OF VIEW | θ (deg) | 40.87 | R | 4.27400E+00 | −9.47135E+01 | Rs | infinite | −2.39398E+01 |
| WAVELENGTH, REFRACTIVITY | | | K | 3.71366E+00 | 0.00000E+00 | D2 | 0.00000E+00 | 6.55434E−05 |
| USED WAVELENGTH | λ (nm) | 780 | B4 | −1.85091E−07 | 0.00000E+00 | D4 | 0.00000E+00 | −3.17434E−09 |
| f-θ LENS 6 REFRACTIVITY | N1 | 1.5242 | B6 | 3.44576E−11 | 0.00000E+00 | D6 | 0.00000E+00 | 1.59261E−12 |
| DISPOSITION OF SCANNING OPTICAL SYSTEM | | | B8 | −6.82420E−15 | 0.00000E+00 | D8 | 0.00000E+00 | 3.96966E−16 |
| POLYGON DEFLECTION SURFACE 5a - LENS ENTRANCE | d1 (mm) | 51.45 | B10 | 7.10650E−19 | 0.00000E+00 | D10 | 0.00000E+00 | −1.69618E−19 |

TABLE 3-continued

STRUCTURE OF OPTICAL SCANNING DEVICE

| SURFACE 6a LENS ENTRANCE SURFACE 6a - LENS EXIT SURFACE 6b | d2 (mm) | 17.90 | | REMOTE FROM LIGHT SOURCE | REMOTE FROM LIGHT SOURCE | | REMOTE FROM LIGHT SOURCE | REMOTE FROM LIGHT SOURCE |
|---|---|---|---|---|---|---|---|---|
| LENS EXIT SURFACE 6b - SURFACE TO BE SCANNED 7 | d3 (mm) | 147.28 | R | 4.27400E+00 | −9.47135E+01 | Rs | infinite | −2.33532E+01 |
| POLYGON DEFLECTION SURFACE 5a - SURFACE TO BE SCANNED 7 | d total | 216.63 | K | 3.71366E+00 | 0.00000E+00 | D2 | 0.00000E+00 | 5.94333E−05 |
| INCIDENCE ANGLE (INCIDENCE OPTICAL SYSTEM) | | | B4 | −1.85091E−07 | 0.00000E+00 | D4 | 0.00000E+00 | 835960E−09 |
| INCIDENCE ANGLE IN MAIN SCAN DIRECTION | α (deg) | 90.00 | B6 | 3.44576E−11 | 0.00000E+00 | D6 | 0.00000E+00 | −3.37599E−12 |
| INCIDENCE ANGLE IN SUB-SCAN DIRECTION | γ (deg) | 3.00 | B8 | −6.82420E−15 | 0.00000E+00 | D8 | 0.00000E+00 | 7.98617E−16 |
| | | | B10 | 7.10650E−19 | 0.00000E+00 | D10 | 0.00000E+00 | −3.20990E−20 |

| f-θ COEFF., SCAN WIDTH, ANGLE OF VIEW | | | | f-θ LENS 6 SAGITTAL ASPHERICAL SHAPE | |
|---|---|---|---|---|---|
| f-θ COEFF. | k (mm/rad) | 150 | | ENTRANCE SURFACE 6a | EXIT SURFACE 6b |
| SCAN WIDTH | W (mm) | 214 | | LEFT & RIGHT, THE SAME | LEFT & RIGHT, THE SAME |
| MAXIMUM ANGLE OF VIEW | θ (deg) | 40.87 | C1 | 0.00000E+00 | 8.56130E−06 |
| WAVELENGTH, REFRACTIVITY | | | C2 | 0.00000E+00 | −1.07739E−09 |
| USED WAVELENGTH | λ (nm) | 780 | C3 | 0.00000E+00 | 0.00000E+00 |

The schematic view of the optical scanning device of the second embodiment in the sub-scan direction, shown in FIG. 12A, will be explained.

In the second embodiment, a light beam Li1 emitted from the light source means 1 is incident upon the deflecting surface 5a of the deflecting means 5, with an angle γ=3(deg) in the sub-scan direction, with respect to the main-scan sectional plane. Also, a deflected light beam Ld1 reflected by the deflecting surface 5a is incident upon the scanning optical element 6 at an angle γ=3(deg) in the sub-scan direction with respect to the main-scan sectional plane. Therefore, the position where a principal ray (dash-and-dot line) of the deflected light beam Ld1 arrives at and passes the entrance surface 6a and exit surface 6b is wide apart from the sagittal optical axis (or meridional) La. The passing positions Za and Zb upon the lens surfaces and the distance $Z_{lens}$ from the optical axis La are above the meridional position ($Z_{lens}$=0), and thus it means $Z_{lens}$>>0.

In the second embodiment, the distance $Z_{lens}$ of the position Za in the sub-scan direction where the deflected light beam Ld1 impinges on the entrance surface 6a of the scanning optical element 6 is $Z_{lens}$=2.73 mm, while the distance $Z_{lens}$ of the position Zb where the light arrives at the exit surface 6b is $Z_{lens}$=3.34 mm.

Further, in regard to a light beam Li2 being obliquely incident with an angel γ=1.5(deg), the distance $Z_{lens}$ of the position Zc in the sub-scan direction where the light beam impinges on the entrance surface 6a of the scanning optical element 6 is $Z_{lens}$=1.36 mm, while the distance $Z_{lens}$ of the position Zd where the light arrives at the exit surface 6b is $Z_{lens}$=1.67 mm.

The deflected light beam Ld (Ld1 or Ld2) passed through the scanning optical element 6 is imaged upon the surface 8 to be scanned, as a spot, by means of the light collecting function of the scanning optical element 6. In the second embodiment, both the deflected light beams Ld1 and Ld2 reach the surface 8 to be scanned, within the main-scan sectional plane (upon the optical axis La of the scanning optical element 6). In order to assure that light beams having different oblique incidence angles such as described above arrive at the same position (on the optical axis) upon the surface 8 to be scanned, the spherical aberration in the sub-scan direction may well be corrected within a range (hatched zone in FIG. 12B) containing the deflected light beams Ld1 and Ld2. This will be described later in greater detail.

Here, the position in the sub-scan direction where the deflected light beam Ld impinges on the surface 8 to be scanned, will be referred to as "irradiated position Zo", while the distance from the optical axis La will be referred to as "$Z_{image}$".

The position in the sub-scan direction of the deflected light beam Ld impinging on the entrance surface 6a and exit surface 6b of the scanning optical system 6 as well as the power (refractive power) being influential to deflect the deflected light beam Ld downwardly, are different with the image height. Because of this, there arises a problem that the distance $Z_{image}$ of the irradiated position Zo does not become even, such that what is called "scan line bending" results therefrom.

In order to solve this problem, in the optical scanning device according to the second embodiment, the exit surface 6b of the scanning optical element 6 which is a single element constituting the scanning optical system, is provided by a sagittal aspherical amount changing surface as defined by the sagittal shape S of aforementioned equation (b) and the numerical values of FIG. 13. Here, the term "sagittal aspherical amount changing surface" refers to a surface in which, along the meridional direction of the lens surface, the aspherical amount ΔXz of sagittal changes as becoming apart from the optical axis La of the lens surface.

Here, the term "sagittal aspherical amount ΔXz" refers to the amount ΔXz, as shown in FIG. 6, through which, at a certain position $Z_{lens}$ ($Z_{lens}$≠0 mm) in the sub-scan direction other than upon the meridional (other than on the sagittal optical axis), the lens surface displaces from the base sagittal curvature radius Rs*. The recitation "the sagittal aspherical amount ΔXz changes" means that the sagittal aspherical amount ΔXz at the same position $Z_{lens}$ ($Z_{lens} \neq 0$ mm) in the sub-scan direction changes with the position Y in the meridional direction. Namely, it means a state $d\Delta Xz/dY \neq 0$.

Figure 14:
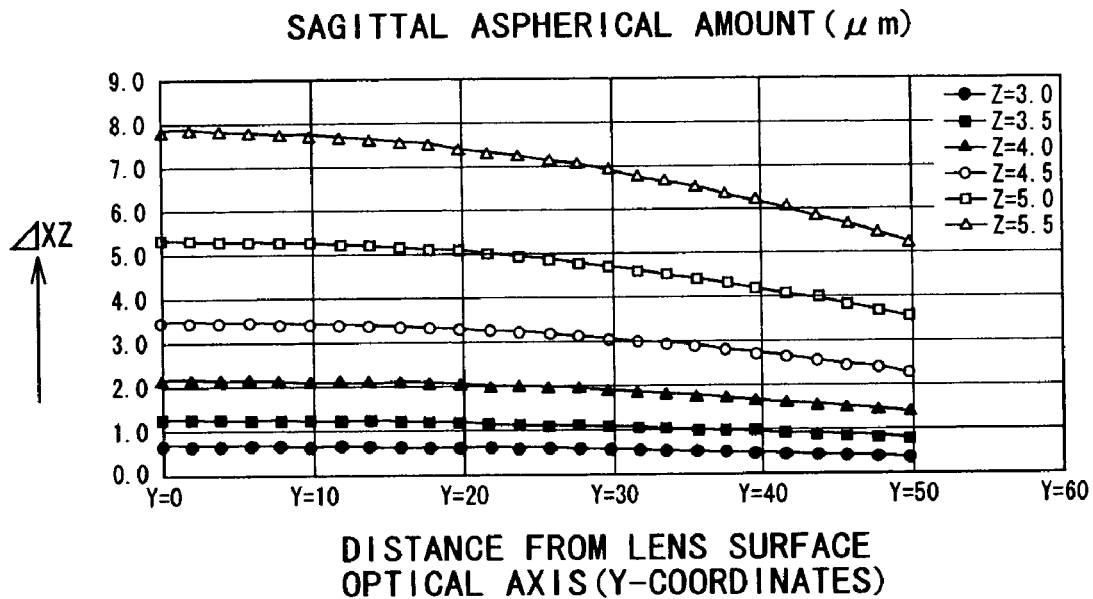
FIG. 14 illustrates the sagittal aspherical amount in the second embodiment of the present invention.
Figure 15:
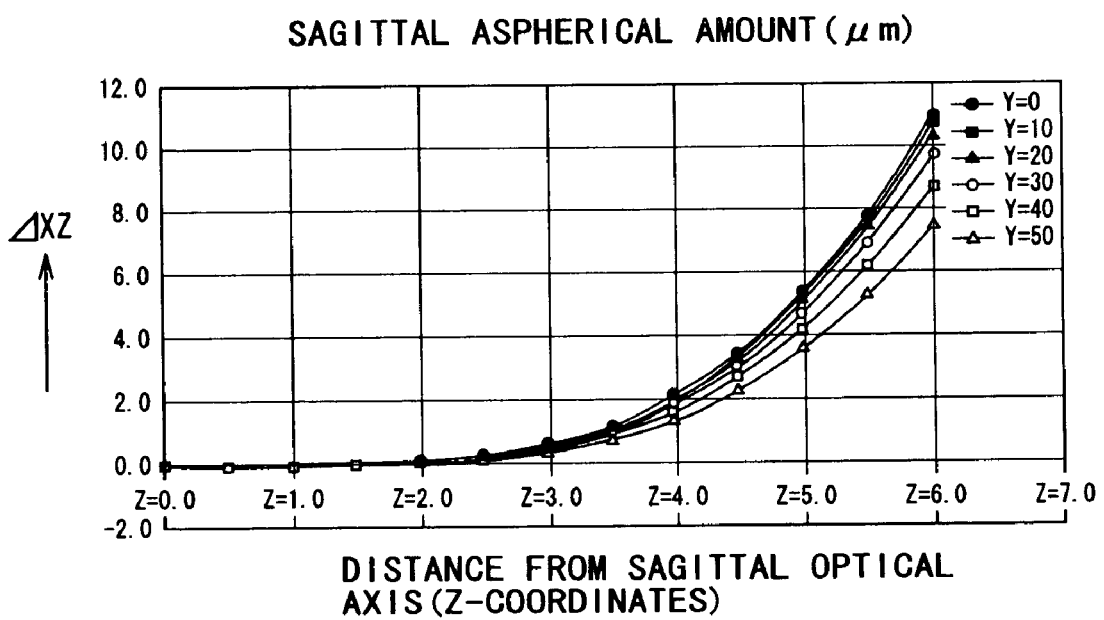
FIG. 15 illustrates the sagittal aspherical amount in the second embodiment of the present invention.

FIG. 13 shows how the sagittal aspherical amount ΔXz of the exit surface 6b of the scanning optical element 6, in the second embodiment, changes. FIG. 14 illustrates how the sagittal aspherical amount ΔXz at a distance Z from the sagittal optical axis changes along the meridional direction (Y value), that is, the sagittal aspherical amount ΔXz at the position ZRa in FIG. 7. FIG. 15 illustrates how the sagittal aspherical amount ΔXz at a distance Y along the meridional direction from the optical axis La of the exit surface 6b, changes in the sub-scan direction (Z direction), that is, the sagittal aspherical amount ΔXz at the position YRa in FIG. 8.

In the second embodiment, the sagittal shape of the exit surface 6b is all made non-arcuate (aspherical). Furthermore, as shown in FIG. 14, the exit surface 6b is defined as such sagittal aspherical amount changing surface that: in the meridional direction, the aspherical amount of sagittal gradually decreases as becoming apart from the optical axis. Also, as shown in FIG. 15, the sagittal aspherical amount is so added that, it gradually increases as becoming apart from the sagittal optical axis in the sub-scan direction. Here, positive sign means displacement from the base arcuate shape toward the surface to be scanned.

The sagittal aspherical amount changing surface is such that, as becoming apart from the optical axis La on the exit surface 6b in the meridional direction, the sagittal aspherical power gradually decreases from zero and, in a portion of the exit surface 6b off the optical axis La, the sagittal aspherical power gradually decreases as becoming apart from the sagittal optical axis La in the sub-scan direction.

Further, the sagittal aspherical power being added is a very small power, as being about 1/100 of the base arcuate shape, and the sagittal aspherical surface is effective only to correction of scan line bending, without substantial contribution to field curvature in the sub-scan direction.

Figure 21A:
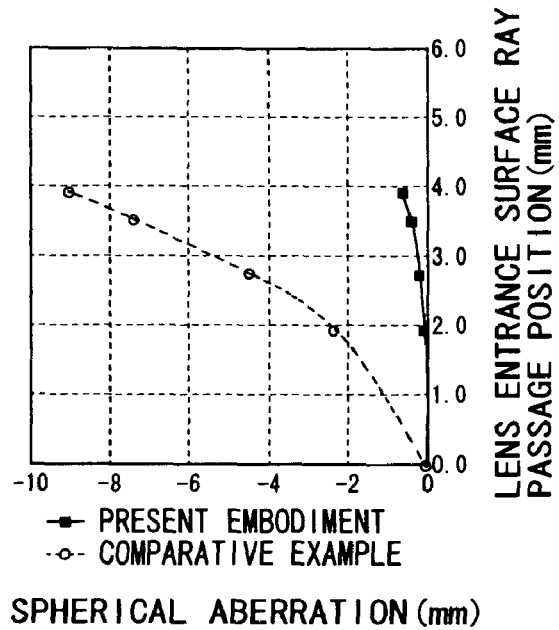
FIGS. 21A and 21B are graphs, respectively, for explaining spherical aberration of the second embodiment of the present invention, in relation to a comparative example.
Figure 21B:
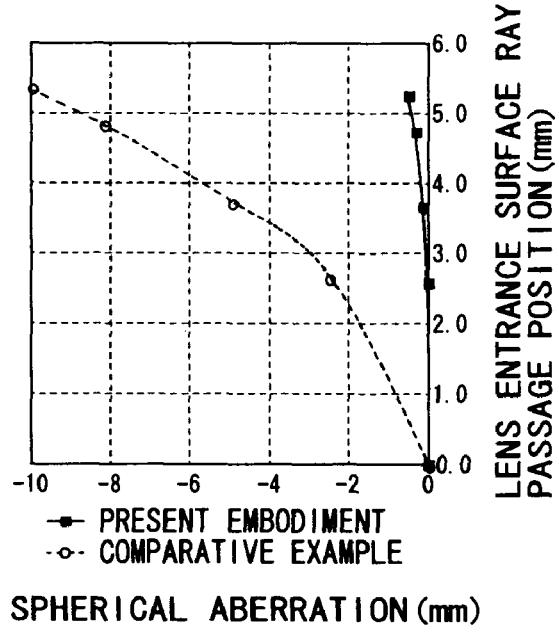

FIGS. 21A and 21B illustrate spherical aberrations in the sub-scan direction at a scan center image height and a scan end image height, in the second embodiment. Although the actual light beam is in a narrow range shown in FIG. 12A, for evaluation of spherical aberration to the lens used in the second embodiment the range depicted by hatching in FIG. 12B was used. As regards the comparative example, a lens without an aspherical surface in the sagittal direction was used. The axis of ordinate represents the position of a light ray in the sub-scan direction, passing through the entrance surface 6a of the scanning optical element 6. As depicted in these graphs, in the whole region including the deflected light beams Ld1 and Ld2, the spherical aberration in the sub-scan direction is corrected satisfactorily.

More specifically, where the focal length of the scanning optical system in the sub-scan direction is fs, the scanning optical element 6 is so arranged that, in the whole region with a light beam incidence angle not greater than γ, the spherical aberration in the sub-scan direction is held to be not greater than 0.05 fs.

With the spherical aberration correction such as described above, a light beam obliquely incident on the region where the spherical aberration has been corrected can be assuredly imaged upon the optical axis of the scanning optical element 6. This provides two advantageous results, as follows.

First, even if the oblique incidence angle γ deviates due to a disposition error of a light source or a collimator lens, for example, the light can be assuredly imaged upon the same irradiated position on a photosensitive drum and, therefore, the adjustment of irradiated position in the sub-scan direction can be simplified. Further, even if the oblique incidence angle γ fluctuates due to any vibration of the device, it does not cause pitch irregularity and, thus, stable image quality can be held.

The second advantage is available when the scanning optical element is used in a different image forming apparatus. More specifically, if the mirror placement or the like after the scanning optical element is modified while changing the oblique incidence angle γ because of any spatial restriction in the main assembly or the like, just the same scanning optical element can be used there. In conventional oblique incidence optical systems, a scanning optical element is arranged with eccentricity for correction of scan line bending. Although this arrangement enables correction of scan line bending in relation to the case of oblique incidence angel γ, it does not meet a different oblique incidence angle γ'. Therefore, if the oblique incidence angle is different, the scanning optical element must be re-designed with respect to such angle.

As compared therewith, once the spherical aberration in the sub-scan direction is corrected within a range in which actual use is expected, as in this embodiment of the present invention, it can provide a scanning optical element which meets any oblique incidence angle γ in that range.

Furthermore, for correction of spherical aberration, in place of applying a sagittal aspherical surface used in the second embodiment, a diffractive optical element surface having an aspherical surface effect may be used. As a further alternative, spherical aberration may be corrected through bending of plural surfaces.

Figure 22A:
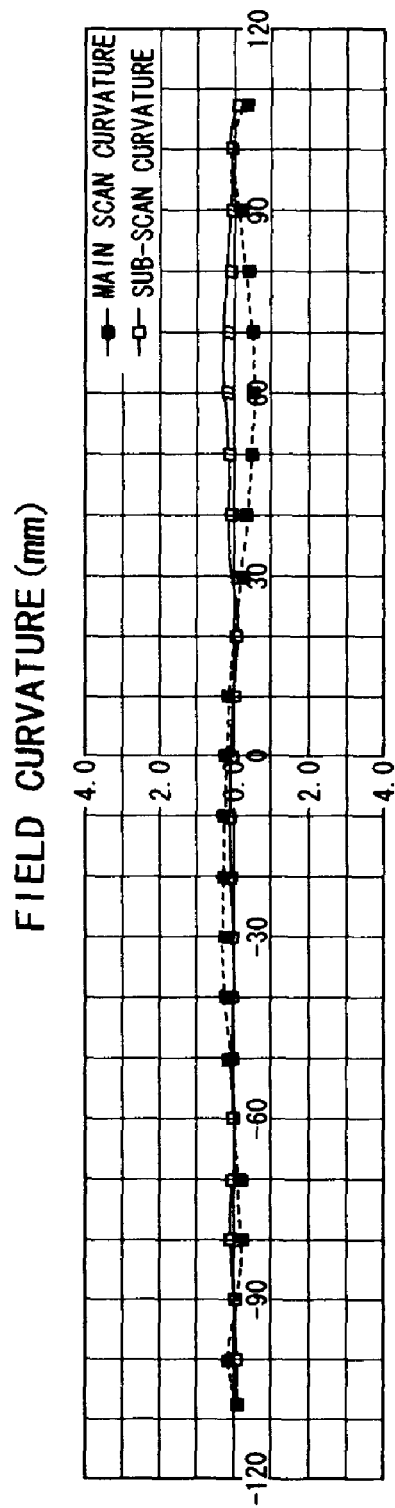
FIGS. 22A and 22B are graphs, respectively, for explaining aberrations of the second embodiment of the present invention.
Figure 22B:
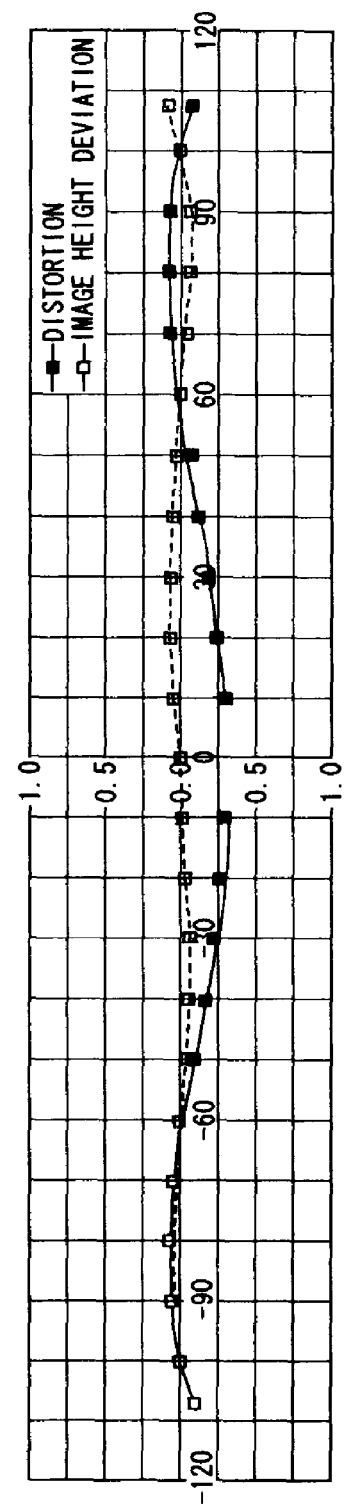

FIGS. 22A and 22B show aberrations in the second embodiment (oblique incidence angle 3°).

The curvature of field in the main scan direction is within a range of ±0.6 mm, and the field curvature in the sub-scan direction is within a range of ±0.3 mm. Thus, they are well corrected. Also, distortion aberration (f-θ characteristic) is within a range of ±0.3% and image height deviation is within a range of ±0.08 mm, and they are well corrected.

Thus, separately from correction of the field curvature in the sub-scan direction on the basis of the light collecting function as provided by the base arcuate shape, controlling the irradiated position on the surface to be scanned, through the aspherical effect thereof, is enabled. Due to its aspherical surface effect, the irradiated position $Z_{oa}$ of the deflected light, being directed to different image heights, can be made even in registration with the irradiated position Zo at the center image height. Namely, the field curvature in the sub-scan direction and the scan line bending can be corrected independently of each other. Regarding registration, more specifically, it is accomplished with a positional deviation in the sub-scan direction of not greater than 10 μm, preferably, not greater than 5 μm.

Figure 16A:
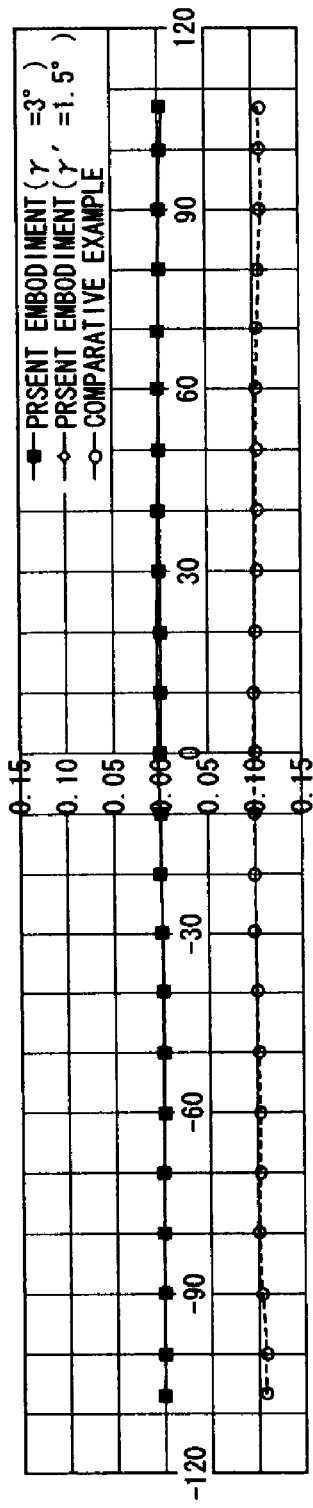
FIGS. 16A and 16B are graphs, respectively, for explaining the irradiated position and the scan line bending, in the first embodiment of the present invention.
Figure 16B:
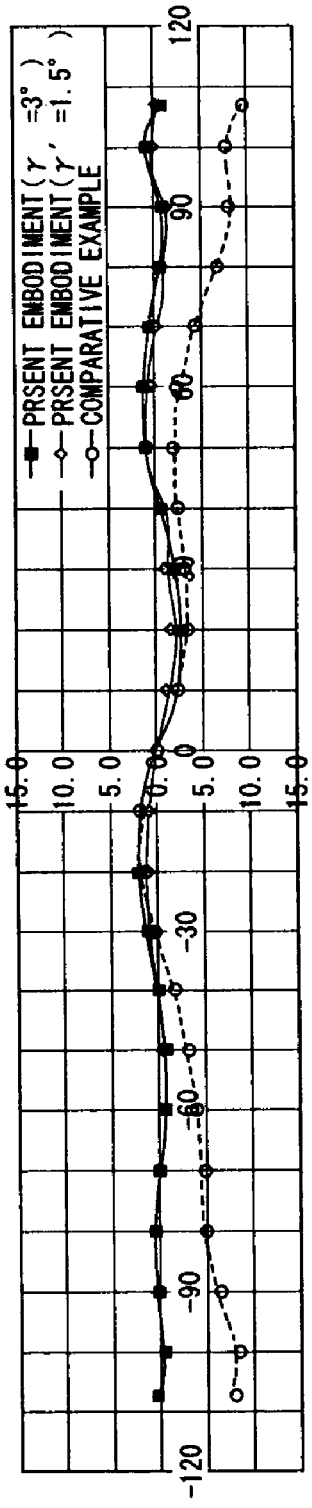

FIGS. 16A and 16B show the irradiated position and scan line bending in an optical scanning device according to the second embodiment (oblique incidence angles 3° and 1.5°), in comparison with those of a comparative example. The optical scanning device of the comparative example had a scanning optical system without the aspherical surface effect of the second embodiment. The scan line bending is defined by deviations in the irradiated position between the center image height and other image heights.

As seen from FIGS. 16A and 16B, the irradiated position at the center image height corresponding to upon the optical axis of the scanning optical system 6 is $Z_{image}=0$ mm in the second embodiment, while $Z_{image}=-0.0997$ mm in the comparative example without a sagittal aspherical surface.

In the comparative example, as compared with the center image height, the irradiated position at an end portion image height is displaced downwardly, and scan line bending of 11 μm is produced. In the second embodiment as compared therewith, the irradiated positions at different image heights are made even, and scan line bending is corrected to a sufficiently small amount of 4.7 μm in the case of oblique incidence angle 3° and 2.3 μm in the case of oblique incidence angle 1.5°.

It is seen from the above that, by changing the sagittal aspherical amount ΔXz as becoming apart from the optical axis La in the meridional direction, the irradiated position at each image height can be made even and the scan line bending can be improved remarkably.

Further, in the optical scanning device according to the second embodiment, since the irradiated position Zo upon the surface 8 to be scanned is made closer to the sagittal optical axis La as compared with the position in the sub-scan direction where the deflected light beam Ld reaches the entrance surface 6a or exit surface 6b of the scanning optical system 6, the scan line bending can be corrected more satisfactorily.

Next, single scanning optical element 6 which constitutes the scanning optical system of the second embodiment will be described. The entrance surface 6a is a cylindrical surface having a power only in the main scan direction. The exit surface 6b is a sagittal curvature radius changing surface wherein the meridional has an arcuate shape while the sagittal has a convex shape and wherein the absolute value of the curvature radius gradually increases as becoming apart from the optical axis in the meridional direction. Further, on both left and right sides of the main scan direction, sandwiching the optical axis of the scanning optical system 6, the sagittal curvature radius changes asymmetrically. As described above, the total power (refractive power) of the scanning optical system 6 in the sub-scan direction is concentrated to the exit surface 6b.

More specifically, desirably 90% or more of the total power is concentrated. Namely, where the power of the scanning optical system 6 in the sub-scan direction is $ø_{so}$ and the power of the sagittal aspherical amount changing surface in the sub-scan direction is $ø_{si}$, the structure is arranged to satisfy the following relation:

$$0.9 \times ø_{so} \leq ø_{si} \leq 1.1 \times ø_{so}$$

FIG. 11 is a schematic view of a main portion of the second embodiment in the main scan direction.

The meridional shape of the exit surface 6b shown in FIG. 11 is arcuate, with such shape that: if the distance, along the optical axis of the scanning optical system 6, from the position in the main scan direction where the deflected light beam is deflected by the deflection surface 5a to the position where the deflected light beam reaches the exit surface 6b is P1 and the distance from the position where the deflected light beam reaches the exit surface 6b to the position where it impinges on the surface 8 to be scanned is P2, in regard to light paths of deflected light beams directed to all the image heights on the surface 8 to be scanned the ratio P2/P1 between them becomes approximately constant (P2/P2=Const) or, alternatively, it becomes within a range of ±10% from a certain value. For example, in regard to the case of the light path for a deflected light beam Ld being directed to an end portion Ip of the image height, if the distance from the position where the deflected light beam Ld is reflected by the deflection surface 5a to the position where the deflected light beam Ld reaches the exit surface 6b is M1 and the distance from the position where the deflected light beam Ld reaches the exit surface 6b to the position where it reaches the surface 8 to be scanned is M2, the meridional shape is so determined that the ratio M2/M1 between them becomes approximately equal to P2/P1 (M2/M1≈P2/P1, more specifically, to be within the range of ±10%). Namely, it is determined to satisfy:

$$0.9 \times \frac{P2}{P1} \leq \frac{M2}{M1} \leq 1.1 \times \frac{P2}{P1}$$

Although in the second embodiment the total power (refractive power) of the scanning optical system 6 in the sub-scan direction is concentrated to the exit surface 6b, both of making the field curvature in the sub-scan direction even through the meridional shape described hereinbefore and making the lateral magnification (sub-scan magnification) βs in the sub-scan direction even at an approximately constant value can be accomplished consistently. The sub-scan magnification of the scanning optical system 6 in the second embodiment is βs=−2.31×.

With this arrangement, even if the scanning optical element 6 is shifted or tilted in the sub-scan direction due to a manufacturing error or assembling error, for example, to produce eccentricity in the sub-scan direction, the design (initial) performance in regard to scan line bending can be maintained.

Namely, in accordance with the optical scanning device of the second embodiment, scan line bending can be corrected satisfactorily throughout the whole image height on the surface 8 to be scanned, and additionally, even if there occurs any eccentricity of the scanning optical element 6 in the sub-scan direction, superior scan line bending performance can be held constantly. Therefore, the second embodiment provides an optical scanning device by which scan line bending can be corrected stably and high-quality images are obtained constantly.

The second embodiment concerns an example in which a light beam emitted from light source means 1 is projected upon the deflecting means at an oblique incidence angle γ with respect to the main-scan sectional plane and in which the position where a deflected light beam to be directed to an end portion of the surface 8 to be scanned is reflectively deflected by the deflecting surface 5a of the polygon mirror 5 is made at the same level as the optical axis of the scanning optical system 6. However, the invention is not limited to this example. As an alternative example, the positions where the deflected light beam to be directed to all the image heights is reflectively deflected by the deflecting surface 5a may be defined above the optical axis. Advantageous results of the present invention are still well available in that occasion.

Further, although the second embodiment concerns an optical scanning device in which a single light beam is optically scanned, the invention is not limited to it. Substantially the same advantageous effects are attainable in a multi-beam type optical scanning device in which two, three, four or more light beams are optically scanned simultaneously.

Furthermore, although the second embodiment relates to an example wherein the scanning optical system is provided by a single scanning optical element, the invention is not limited to it. The scanning optical system may comprise plural optical components such as scanning optical elements or imaging mirrors. At least one surface of such scanning optical elements may be made into a sagittal aspherical amount changing surface and, by which, scan line bending can be corrected satisfactorily.

It should be noted that in the second embodiment the entrance surface and/or the exit surface of the scanning optical element may be formed with diffraction means to provide a similar aspherical surface function as described hereinbefore.

The second embodiment concerns an example of optical scanning device with only one sagittal aspherical amount changing surface, in which only the exit surface 6b of the scanning optical element 6 is formed into a sagittal aspherical amount changing surface. However, the invention is not limited to this. Substantially the same advantageous results as of the second embodiment may be attainable with an optical scanning device with plural sagittal aspherical amount changing surfaces, in which the entrance surface 6a also of the scanning optical system 6 is formed into a sagittal aspherical amount changing surface to share the aspherical mount by two surfaces.

Further, although in the second embodiment the meridional shape of the exit surface 6b of the scanning optical system 6 is arcuate, the invention is not limited to this. If a non-arcuate shape (aspherical shape) is use, aberrations in the main scan direction can be well corrected and, thus, substantially the same advantageous results or better results are obtainable in that occasion.

Furthermore, while the second embodiment uses two coefficients $Z^4$ and $Z^4Y^2$ for the aspherical surface term of sagittal, the invention is not limited to this. A polynomial wherein the number of orders for "Y" concerning "$Z^4$" is increased such as $Z^4Y^4$, $Z^4Y^6$, $Z^2Y^8$, etc., or a polynomial wherein the number of orders for "Z" concerning each order of "Y" is increased in addition to the above, such as $Z^6$, $Z^6Y^2$, $Z^6Y^4$, $Z^6Y^6$, $Z^6Y^8$, etc., and $Z^8$, $Z^8Y^2$, $Z^8Y^4$, $Z^8Y^6$, $Z^8Y^8$, etc., may be used for expression of the sagittal aspherical surface. The advantageous effects of the present invention can be enhanced furthermore, in that occasion.

[Embodiment 3]

Figure 17A:
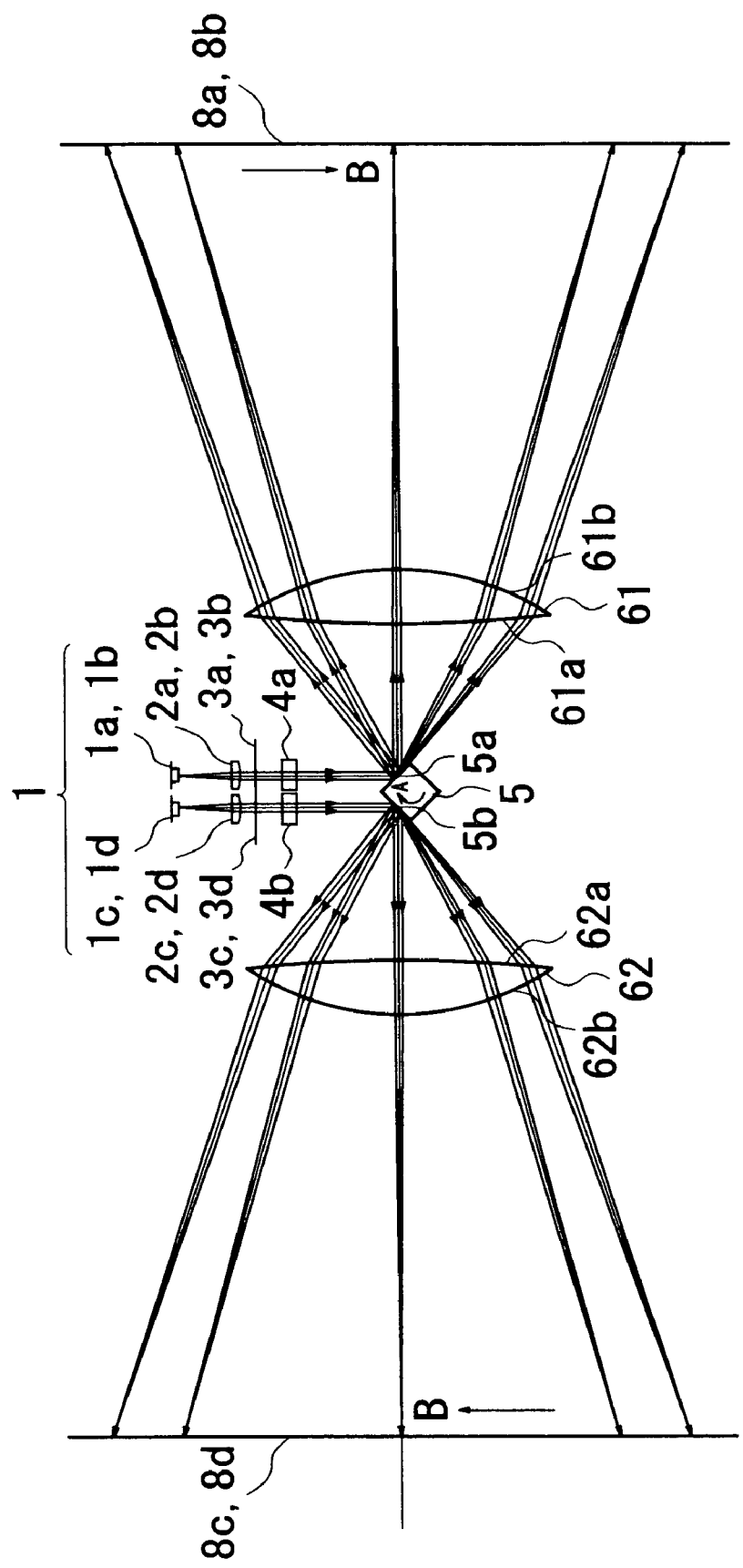
FIG. 17A is a main-scan sectional view in a third embodiment of the present invention.
Figure 17B:
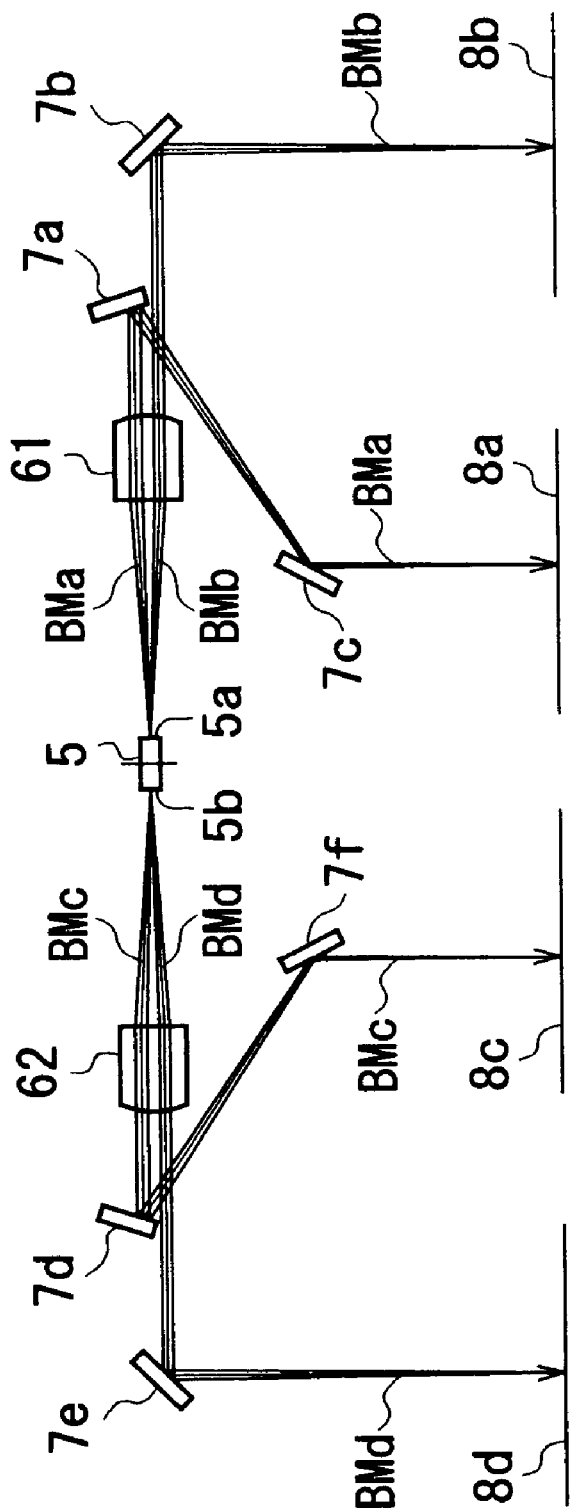
FIG. 17B is a sub-scan sectional view in the third embodiment of the present invention.

FIG. 17A is a main-scan sectional view of an optical scanning device according to a third embodiment of the present invention, and FIG. 17B is a sub-scan sectional view of the same.

The third embodiment includes two optical scanning devices according to the first or second embodiment, but single deflecting means is shared by them. More specifically, the third embodiment concerns an optical scanning device for a color image forming apparatus wherein two light beams are inputted to each scanning optical system 6 and, thus, four light beams are projected simultaneously upon single deflecting means 5, such that our light beams are deflected by the single deflecting means 5 to thereby optically scan photosensitive drums 8a–8d corresponding to the four light beams, respectively.

In FIGS. 17A and 17B, denoted at 1 is light source means (multi-beam laser) which comprises four semiconductor lasers 1a, 1b, 1c and 1d each being adapted to emit a single light beam. Each of four divergent light beams emitted from the four semiconductor lasers 1a–1d is transformed by associated one of collimator lenses (first optical element) 2a, 2b, 2c and 2d into an approximately parallel light beam (it may be a convergent light beam or a divergent light beam).

Subsequently, aperture stops 3a, 3b, 3c and 3d function to restrict the beam width of the corresponding light beams. Of these light beams, two approximately parallel light beams passed through the aperture stops 3a and 3b are imaged by means of a first cylindrical lens (second optical element) having a power only in the sub-scan direction, adjacent the deflecting surface 5a of the deflecting means (to be described) as a linear image extending along the main-scan sectional plane. Also, two approximately parallel light beams passed through the aperture stops 3c and 3d are imaged by means of a second cylindrical lens 4b having a power only in the sub-scan direction, adjacent the deflecting surface 5b of the deflecting means 5 (to be described) as a linear image extending along the main-scan sectional plane.

Denoted at 5 is the deflecting means which comprises a polygon mirror (rotational polygonal mirror) having a four-surface structure, for example. It is rotated in the direction of an arrow A and at a constant speed, by driving means (not shown) such as a motor, for example.

Denoted at 61 is a first scanning optical system which consists of a single scanning optical element (f-θ lens) made by plastic molding and having an f-θ characteristic. Denoted at 62 is a second scanning optical system which consists of a single scanning optical element (f-θ lens) made by plastic molding and having an f-θ characteristic. Each scanning optical element serves to image two deflected light beams BMa and BMb (BMc and BMd) reflectively deflected by the deflecting means 5 upon photosensitive drum surfaces 8a and 8b (8c and 8d) which are surfaces to be scanned. Also, they serve to correct surface tilt of the deflecting surface 5a (5b) of the deflection means 5. Here, the four deflected light beams BMa–BMd reflectively deflected by the deflecting surfaces 5a and 5b of the deflection means 5 are directed through the first scanning optical system 61 or the second scanning optical system 62 onto the four photosensitive drum surfaces 8a, 8b, 8c and 8d (cyan, magenta, yellow and black) corresponding to the four light beams, respectively. By rotating the deflection means 5 in the direction of an arrow A, the photosensitive drum surfaces 8a–8d are optically scanned in the direction of an arrow B. In this manner, a single scan line is defined on each of the four photosensitive drum surfaces 8a–8d, whereby imagewise recording is carried out.

Each scanning optical system 61 (62) shares a common scanning optical element, for two light beams BMa and BMb (BMc and BMd) and, by which, a single scan line is defined on each of the four photosensitive drum surfaces 8a–8d and the imagewise recording is carried out.

Hereinafter, for simplicity of explanation, the scanning optical systems 61 and 62 will be referred to also as a scanning optical system 6, and collimator lenses 2a, 2b, 2c and 2d will be referred to also as a collimator lens 2. Also, the aperture stops 3a, 3b, 3c and 3d will be referred to also as an aperture stop 3, and cylindrical lenses 4a and 4b will be referred to also as a cylindrical lens 4. The surfaces 8a, 8b, 8c and 8d to be scanned will be referred to also as a surface 8 to be scanned.

The third embodiment concerns an example wherein the invention is applied to a color image forming apparatus having four photosensitive drums corresponding to colors of cyan, magenta, yellow and black, respectively. A color image is formed by superposition of the four colors and, if there occurs a deviation in printing position of the scan lines corresponding to these colors, color misregistration results therefrom which causes degradation of the image quality. It is therefore necessary to assure registration of printing position for the scan lines corresponding to the colors.

The third embodiment concerns an optical scanning device for optically scanning four light beams simultaneously by use of two scanning optical systems 61 and 62 relative to a single polygon mirror 5, as shown in FIG. 17B. More specifically, the deflected light beams BMa and BMc incident on the scanning optical systems 61 and 62, respectively, in a portion above the sagittal optical axis, are turned back downwardly by first and second returning mirrors 7a and 7d, respectively, each at a position close to the scanning optical element 61 or 62, and subsequently, the light beams are reflected by third and fourth returning mirrors 7c and 7f, respectively, toward the photosensitive drum surfaces 8a and 8c, respectively. On the other hand, the deflected light beams BMb and BMd incident on the scanning optical elements 61 and 62 in a portion below the sagittal optical axis are reflected toward the photosensitive drum surfaces 8b and 8d, respectively, by fifth and sixth returning mirrors 7b and 73, respectively, each at a position apart from the scanning optical element 61 or 62.

As described, the returning mirrors are disposed approximately linearly symmetrically with respect to the rotational axis of the polygon mirror, and thus an optical scanning device of simple and compact structure is provided.

Generally, where returning mirrors are disposed linearly symmetrically with respect to the rotational axis of the polygon mirror 5 as in the third embodiment, there is a possibility that the direction bending of the scan lines, optically scanning the photosensitive drum surfaces, is reversed and, if an optical scanning device having large scan line bending is used, the problem of color misregistration becomes quite notable. Further, if the disposition of the returning mirrors is reversed from this embodiment so that a deflected light beam incident on the second scanning optical system 62 at a position below the sagittal optical axis is directed to the photosensitive drum surface 8 by means of an even number of returning mirrors, while a deflected light beam incident on above the sagittal optical axis is directed to the photosensitive drum surface 8 by means of an odd number of returning mirrors, the direction of the scan line bending itself can be made even. However, extension of the light paths becomes very complicated, and it leads to bulkiness of the optical scanning device or to an increase in the number of returning mirrors that makes the structure very complicated.

In consideration of it, in the third embodiment, the sagittal shape of the exit surface 6b of each of the first and second scanning optical systems 61 and 62 is made non-arcuate (aspherical). Moreover, it uses a sagittal aspherical amount changing surface that the sagittal aspherical amount changes as becoming apart from the optical axis La of the exit surface 6b, along the meridional direction, thereby to suppress the scan line bending to a very small level. The third embodiment, with this arrangement, assures provision of an optical scanning device by which, even if an optical path layout (or returning mirror disposition) in which the direction of scan line bending is reversed is applied there, a high-quality color image can be produced stably without the problem of color misregistration.

It should be noted, in the third embodiment, the entrance surface and/or the exit surface of the scanning optical system may be formed with diffraction means to provide a similar aspherical surface function as described hereinbefore.

Although in the third embodiment the number of scanning optical element which constitutes the scanning optical system is one, the invention is not limited to this. Plural optical elements may be used therefor, with sufficient advantageous results of the present invention. As a matter of course, a scanning optical element having a power only in the sub-scan direction may be formed with a sagittal aspherical amount changing surface.

Further, in the third embodiment a single light beam is optically scanned along associated one of the photosensitive drum surfaces corresponding to different colors, respectively, the invention is not limited to this. As an example, eight light beams may be reflectively deflected by the polygon mirror at once, while on the other hand four light beams are projected to each of the two scanning optical systems, whereby two light beams are directed to each photosensitive drum surface for optical scan thereof. Substantially the same advantageous results as of the present invention will be attainable with an optical scanning device of such structure.

[Image Forming Apparatus]

Figure 18:
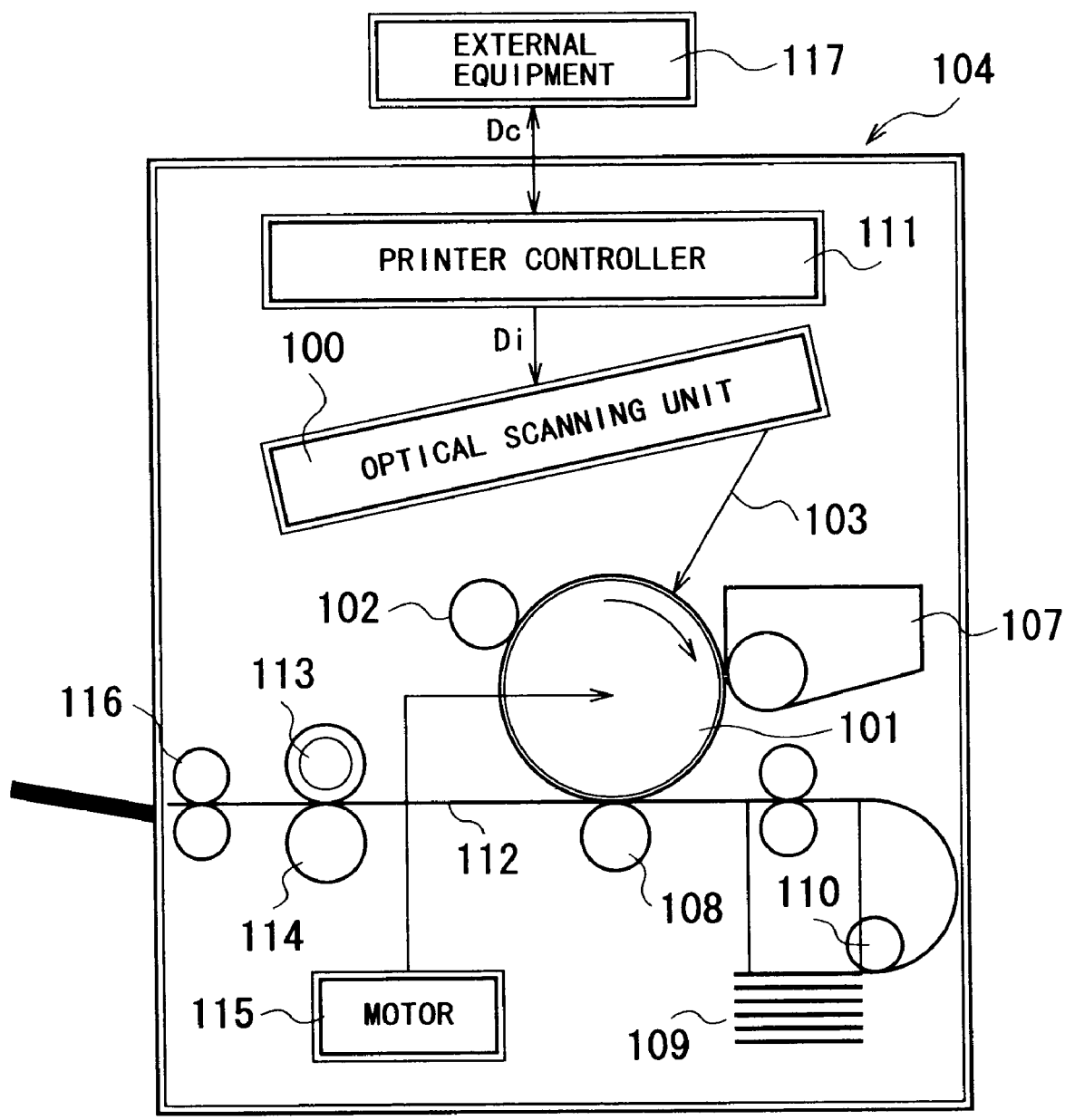
FIG. 18 is a schematic view of a main portion of an image forming apparatus according to the present invention.

FIG. 18 is a sectional view of a main portion, in a sub-scan direction, of an image forming apparatus according to an embodiment of the present invention. In FIG. 18, denoted at 104 is the image forming apparatus. In this image forming apparatus 104, code data Dc is imputed thereinto from an external equipment 117 such as a personal computer, for example. The code data DC is converted by a printer controller 111 in the apparatus, into imagewise data (dot data) Di. The imagewise data Di is than applied to an optical scanning unit 100 having a structure such as described with reference to the first or second embodiment of the present invention. The optical scanning unit 100 produces a light beam 103 being modulated in accordance with the imagewise data Di, and, by this light beam 103, a photosensitive surface of a photosensitive drum 100 is optically scanned in the main scan direction.

The photosensitive drum 101 which is an electrostatic latent image bearing member (photosensitive member) is rotated clockwise by a motor 115. With this rotation, the photosensitive surface of the photosensitive drum 101 moves relatively to the light beam 103, in the sub-scan direction perpendicular to the main scan direction. Disposed above the photosensitive drum 101 is a charging roller 102, being in contact with the drum surface, for uniformly electrically charging the surface of the photosensitive drum 101. The light beam 103 scanned by the optical scanning unit 100 is projected onto the surface of the photosensitive drum 101, being electrically charged by the charging roller 102.

As described hereinbefore, the light beam 103 is modulated in accordance with the imagewise data Di and, by irradiating with this light beam 103, an electrostatic latent image is formed on the surface of the photosensitive drum 101. The electrostatic latent image thus formed is then developed into a toner image, by means of a developing device 107 which is disposed downstream of irradiation position of the light beam 103 with respect to the rotational direction of the photosensitive drum 101, and which is provided in contact with the photosensitive drum.

The toner image developed by the developing device 107 is transferred to a paper sheet (transfer material) 112, by means of a transfer roller 108 which is disposed below the photosensitive drum 101 and placed to be opposed to the photosensitive drum. Paper sheets 112 are accommodated in a sheet cassette 109 before (at right-hand side in FIG. 18) the photosensitive drum 101, but paper sheets can be supplied manually. At an end of the sheet cassette 109, there are sheet supplying rollers 110 for feeding paper sheets 112 in the cassette 109, into the conveyance path.

The paper sheet 112 having an unfixed toner image transferred thereto is then conveyed to a fixing device after (at left-hand side in FIG. 18) the photosensitive drum 101. The fixing device includes a fixing roller 113, having an unshown fixing heater accommodated therein, and a pressing roller 114 disposed to be press contacted to the fixing roller 113. The paper sheet 112 conveyed from the transfer station is pressed and heated at the press contact nip between the fixing roller 113 and the pressing roller 114, whereby the unfixed toner image on the paper sheet 112 is fixed thereto. Disposed after the fixing roller 113 are of paper discharging rollers 116, and they function to discharge the image-fixed paper sheet 112 outwardly of the image forming apparatus.

Although not illustrated in FIG. 18, the printer controller 111 has not only the function of data conversion as described above but also the function of controlling components such as motor 115, for example, inside the image forming apparatus and polygon motor or the like inside the optical scanning unit, to be described later.

[Color Image Forming Apparatus]

Figure 19:
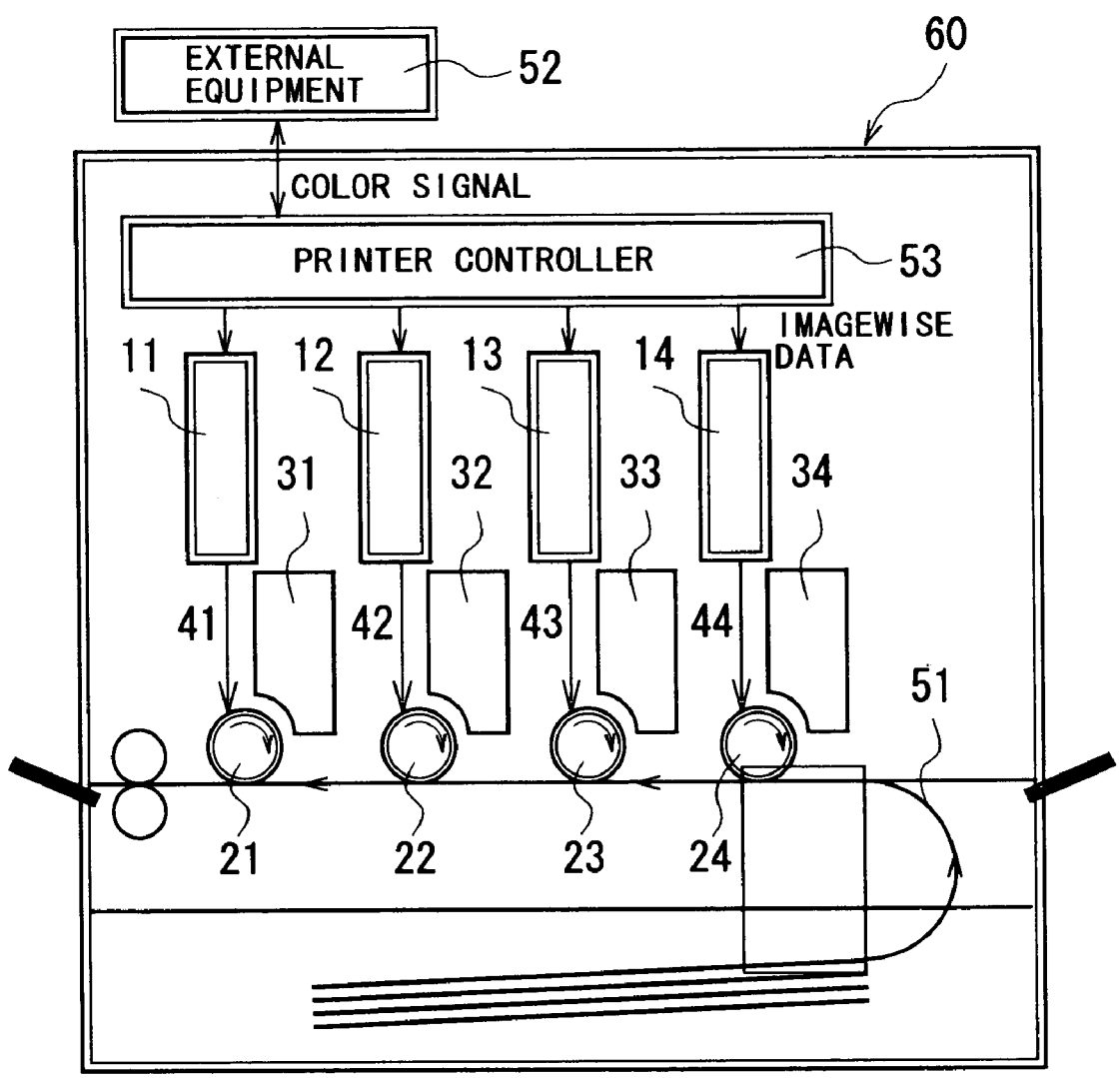
FIG. 19 is a schematic view of a main portion of a color image forming apparatus according to the present invention.
Figure 20:
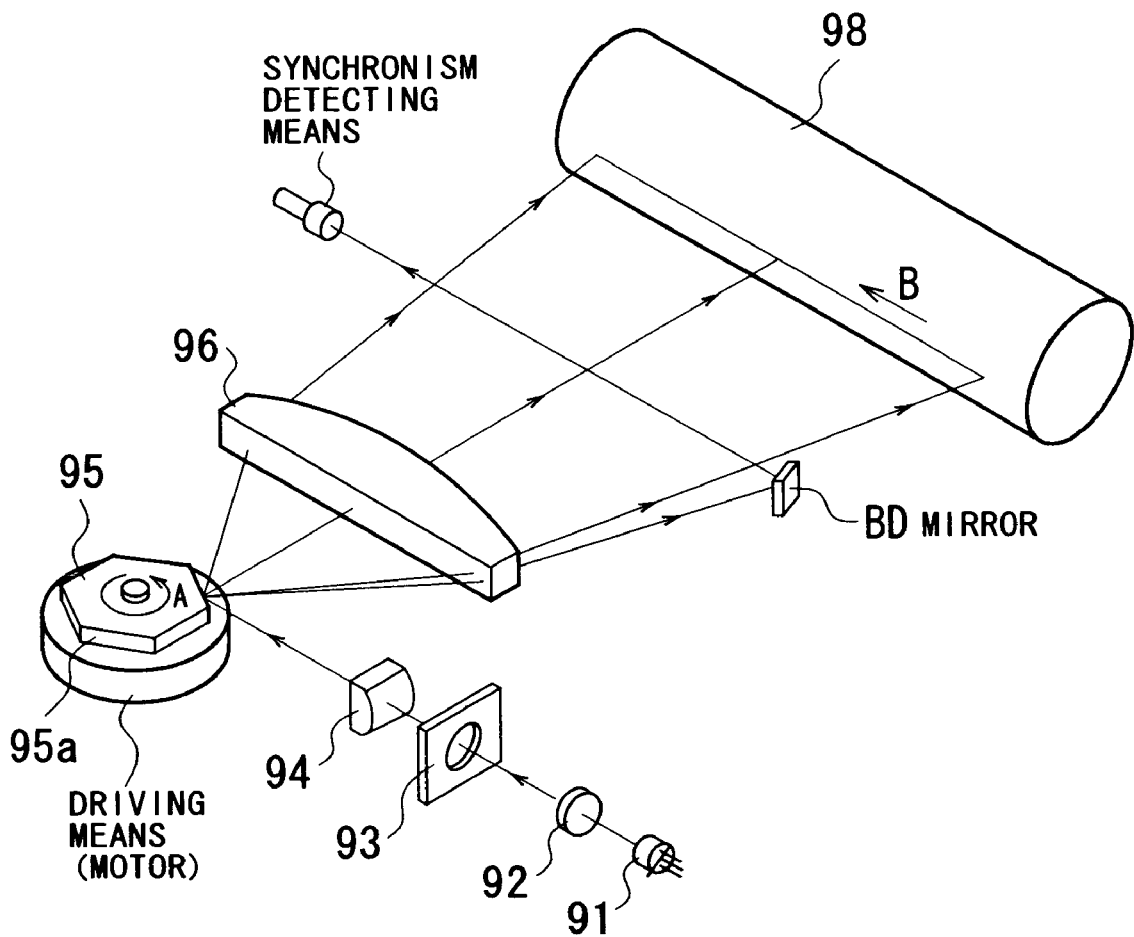
FIG. 20 is a perspective view of a conventional optical scanning device.

FIG. 19 is a schematic view of a main portion of a color image forming apparatus according to an embodiment of the present invention. This embodiment concerns tandem type color image forming apparatus in which four optical scanning devices are disposed in an array to record imagewise information upon photosensitive drums (image bearing members), respectively, in parallel to each other. In FIG. 19, denoted at 60 is the color image forming apparatus. Denoted at 11, 12, 13 and 14 are optical scanning devices having a structure such as described with reference to the first or second embodiment of the present invention. Denoted at 21, 22, 23 and 24 are photosensitive drums or image bearing members, and denoted at 31, 32, 33, and 34 are developing devices. Denoted at 51 is a conveyance belt.

In FIG. 19, the color image forming apparatus 60 receives input color signals of R (red), G (green) and B (blue) from an external equipment 52 such as a personal computer or the like. These color signals are converted by a printer controller 53 inside the image forming apparatus into imagewise data (dot data) of C (cyan), M (magenta), Y (yellow) and B (black), respectively. These imagewise data are then applied into the optical scanning devices 11, 12, 13 and 14, respectively. The optical scanning devices then produces light beams 41, 42, 43 and 44, being modulated in accordance with the imagewise data, respectively, so that the photosensitive surfaces of the photosensitive drums 21, 22, 23 and 24 are optically scanned in the main scan direction by these light beams.

The color image forming apparatus of this embodiment has four optical scanning devise 11–14 to perform recording of imagewise signals (imagewise information) upon the surfaces of photosensitive drums 21, 22, 23 and 24 in parallel to each other and in accordance with four colors of C (cyan), M (magenta), Y (yellow) and B (black), respectively. Thus, a color image can be printed at a higher speed.

As described above, the color image forming apparatus of this embodiment includes four optical scanning devices 11–14 to produce latent images of corresponding colors on the surfaces of associated photosensitive drums 21–24, respectively, by use of light beams which are based on the respective imagewise data. After this, these images are superposedly transferred to a recording material, whereby a single full-color image is produced.

As regards the external equipment 52, a color image reading apparatus having a CCD sensor, for example, may be used. In that occasion, the color image reading apparatus and the color image forming apparatus in combination may constitute a color digital copying machine.

In accordance with the embodiments of the present invention as described hereinbefore, at least one surface of a scanning optical element constituting a scanning optical system is formed with a sagittal aspherical amount changing surface in which an aspherical amount of sagittal changes in the meridional direction. This assures an optical scanning device and an image forming apparatus having the same, by which scan line bending can be reduced significantly.

Further, when a plurality of optical scanning devices such as above are to be incorporated into a color image forming apparatus, by improving the light path layout or the latitude of returning mirror disposition, a color image forming apparatus with a reduced number of returning mirrors or with a simple and compact structure can be provided.

The present invention accomplishes an optical scanning device or an image forming apparatus using the same, of the structure that: as described hereinbefore, in the scanning optical system, light is obliquely incident upon a plane orthogonal to a rotational axis of deflecting means and, through the correction of spherical aberration in the sub-scan direction within a certain region in the sub-scan direction, light can be assuredly imaged on the optical axis of the scanning optical element, regardless of the oblique incidence angle and as long as it is within the spherical aberration corrected region; and that through the correction of spherical aberration in the sub-scan direction within an effective scan range in the main scan direction, the scan line bending can be reduced.

Moreover, the present invention accomplishes an optical scanning device of simple structure and an image forming apparatus using the same, by which an optical scanning element can be used interchangeably between different image forming apparatuses.

The present invention accomplishes an optical scanning device of simple structure and an image forming apparatus using the same, wherein a scanning optical system is provided by a single scanning optical element having an anamorphic surface and wherein one surface of the scanning optical element is provided by an aspherical surface in the main-scan sectional plane, whereby scan line bending can be reduced.

While the invention has been described with reference to the structures disclosed herein, it is not confined to the details set forth and this application is intended to cover such modifications or changes as may come within the purposes of the improvements or the scope of the following claims.

What is claimed is:

1. An optical scanning device, comprising:
   light source means;
   deflecting means for deflecting a light beam emitted from said light source means; and
   a scanning optical system for scanning a surface to be scanned, with the light beam deflected by said deflecting means;
   wherein said scanning optical system includes a scanning optical element disposed so that, with respect to a sub-scan direction, a principal ray of the deflected light beam passes a portion other than an optical axis of the scanning optical system,
   wherein said scanning optical element has a sagittal aspherical amount changing surface in which an aspherical amount of a sagittal changes along a main scan direction of said scanning optical element, and wherein, within an effective scan range upon the surface to be scanned, the position in the sub-scan direction upon which the deflected light beam impinges is made even.

2. An optical scanning device according to claim 1, wherein said scanning optical system is arranged so that, within an effective scan range upon the surface to be scanned, an amount of deviation of the position in the sub-scan direction upon which the deflected light beam impinges is held to be not greater than 10 μm.

3. An optical scanning device according to claim 1, wherein the light beam emitted from said light source means is incident on a plane, perpendicular to a rotational axis of said deflecting means, with a certain angle defined thereto.

4. An optical scanning device according to claim 1, wherein, in the sub-scan direction, the position on the surface to be scanned, upon which a principal ray of the deflected light beam impinges, is made closer to the optical axis of said scanning optical system, as compared with the position where the principal ray passes through the surface of said scanning optical element which surface has a largest power.

5. An optical scanning device according to claim 1, wherein said scanning optical system has one or more sagittal curvature radius changing surfaces in which a sagittal curvature radius changes along the main scan direction of said scanning optical system.

6. An optical scanning device according to claim 1, wherein said scanning optical system consists of a single scanning optical element.

7. An optical scanning device according to claim 1, wherein said scanning optical system has a power in the sub-scan direction which is equal to or approximately equal to a power of said sagittal aspherical amount changing surface.

8. An optical scanning device according to claim 7, wherein, where the power of said scanning optical system in the sub-scan direction is $\varnothing_{so}$ and the power of said sagittal aspherical amount changing surface in the sub-scan direction is $\varnothing_{si}$, a relation $0.9 \times \varnothing_{so} \leq \varnothing_{si} \leq 1.1 \times \varnothing_{so}$ is satisfied.

9. An optical scanning device according to claim 1, wherein said light source means emits two or more light beams, and wherein, within the sub-scan sectional plane, a principal ray of at least one light beam passes an upper side with respect to the optical axis of said scanning optical system while a principal ray of at least one different light beam passes a lower side with respect to the optical axis of said scanning optical system.

10. An optical scanning device according to claim 1, wherein said deflecting means deflects plural light beams, wherein said scanning optical system includes a plurality of scanning optical elements for imaging the light beams deflected by said deflecting means, upon a plurality of surfaces to be scanned, which surfaces correspond to the light beams, respectively, and wherein said deflecting means is shared by plural scanning optical systems.

11. An optical scanning device according to claim 1, wherein, where, within the main scan sectional plane, an air-converted distance from said deflecting means to a light exit surface of said scanning optical element along the optical axis is P1, a distance from the light exit surface of said scanning optical element to the surface to be scanned is P2, an air-converted distance from said deflecting means, being out of the axis, to the light exit surface of said scanning optical element is M1, and a distance from the light exit surface of said scanning optical element to the surface to be scanned is M2, the following relation is satisfied:

$$0.9 \times \frac{P2}{P1} \leq \frac{M2}{M1} \leq 1.1 \times \frac{P2}{P1}.$$

12. An image forming apparatus, comprising:
an optical scanning device as recited in claim 1;
a photosensitive member disposed at a position of the surface to be scanned;
a developing device for developing an electrostatic latent image formed on said photosensitive member with a light beam scanned with said optical scanning device, to produce a toner image;
a transfer device for transferring the developed toner image to a transfer material; and
a fixing device for fixing the transferred toner image on the transfer material.

13. An image forming apparatus, comprising:
an optical scanning device as recited in claim 1; and
a printer controller for converting code data, inputted from an external equipment, into an imagewise signal and for applying the imagewise signal to said optical scanning device.

14. A color image forming apparatus, comprising:
at least one optical scanning device as recited in claim 1; and
a plurality of image bearing members on which images of different colors are to be formed.

15. An apparatus according to claim 14, further comprising a printer controller for converting a color signal, inputted from an external equipment, into imagewise data of different colors and for applying the imagewise data to corresponding optical scanning devices, respectively.

16. An optical scanning device, comprising:
light source means;
deflecting means for deflecting said light beam emitted from said light source means; and
an imaging optical system for imaging a surface to be scanned, with the light beam deflected by said deflecting means;
wherein the light beam emitted from said light source means is incident on a plane, perpendicular to a rotational axis of said deflecting means, with a certain angle defined thereto,
wherein said imaging optical system includes an imaging optical element disposed so that, with respect to a sub-scan direction, a principal ray of the deflected light beam passes through an iside of said imaging optical element away from an optical axis,
wherein said imaging optical element has a sagittal aspherical amount changing surface in which said sagittal aspherical amount changes along a main scan direction of said imaging optical element,
wherein said sagittal aspherical amount changing surface has an absolute value of said sagittal aspherical amount which increases along the sub-scanning direction, and
wherein said sagittal aspherical amount changing surface has a sagittal curvature radius which changes along the main scan direction independently of a meridional curvature radius thereof.

17. An optical scanning device according to claim 16, wherein said scanning optical system is arranged so that, within an effective scan range upon the surface to be scanned, an amount of deviation of the position in the sub-scan direction upon which the deflected light beam impinges is held to be not greater than 10 μm.

18. An optical scanning device according to claim 16, wherein said light source means emits two or more light beams, and wherein, within the sub-scan sectional plane, a principal of at least one light beam passes an upper side with respect to the optical axis of said scanning optical system while a principal ray of at least one different light beam passes a lower side with respeect to the optical axis of said scanning optical system.

19. An optical scanning device according to claim 16, wherein said deflecting means deflects plural light beams, wherein said scanning optical system includes a plurality of scanning optical elements for imaging the light beams deflected by said deflecting means upon a plurality of surfaces to be scanned, which surfaces correspond to the light beams, respectively, and wherein said deflecting means is shared by plural scanning optical systems.

20. An image forming apparatus, comprising:
an optical scanning device according to claim 16;
a photosensitive member disposed at a position of the surface to be scanned;
a developing device for developing an electrostatic latent image formed on said photosensitive member with a light beam scanned with said optical scanning device to produce a toner image;
a transfer device for transferring the developed toner image to a transfer material; and
a fixing device for fixing the transferred toner image on the transfer material.

21. An image forming apparatus, comprising:
an optical scanning device according to claim 16; and
a printer controller for converting code data, inputted from an external equipment, into an imagewise signal and for applying the imagewise signal to said optical scanning device.

22. A color image forming apparatus, comprising:
at least one optical scanning device according to claim 16; and
a plurality of image bearing members on which images of different colors are to be formed.

23. An apparatus according to claim 16, further comprising a printer controller for converting a color signal, inputted from an external equipment, into imagewise data to corresponding optical scanning devices, respectively.

24. An optical scanning device, comprising:
light source means;
deflecting means for deflecting said light beam emitted from said light source means; and
an imaging optical system for imaging a surface to be scanned, with the light beam deflected by said deflecting means;
wherein the light beam emitted from said light source means is incident on a plane, perpendicular to rotational axis of said deflecting means, with a certain angle defined thereto,
wherein said imaging optical system includes an imaging optical element disposed so that, with respect to a sub-scan direction, a principal ray of the deflected light beam passes through a portion away from an optical axis of said imaging optical element,
wherein said imaging optical element has a sagittal aspherical amount changing surface in which said sagittal aspherical amount changes along a main scan direction of said imaging optical element, and
wherein said sagittal aspherical amount changing surface has a sagittal curvature radius which changes along the main scan direction independently of a meridional curvature radius thereof.

25. An optical scanning device according to claim 24, wherein said scanning optical system is arranged so that, within an effective scan range upon the surface to be scanned, an amount of deviation of the postion in the sub-scan direction upon which the deflected light beam impinges is held to be not greater than 10 µm.

26. An optical scanning device according to claim 24, wherein said light source means emits two or more light beams, and wherein, within the sub-scan sectional plane, a principal ray of at least one light beam passes an upper side with respect to the optical axis of said scanning optical system while a principal ray of at least one different light beam passes a lower side with respect to the optical axis of said scanning optical system.

27. An optical scanning device according to claim 24, wherein said deflecting means deflects plural light beams, wherein said scanning optical system includes a plurality of scanning optical elements for imaging the light beams deflected by said deflecting means upon a plurality of surfaces to be scanned, which surfaces correspond to the light beams, respectively, and wherein said deflecting means is shared by plural scanning optical systems.

28. An image forming apparatus, comprising:
an optical scanning device according to claim 24;
a photosensitive member disposed at a position of the surface to be scanned;
a developing device for developing an electrostatic latent image formed on said photosensitive member with a light beam scanned with said optical scanning device, to produce a toner image;
a transfer device for transferring the developed toner image to a transfer material; and
a fixing device for fixing the transferred toner image on the transfer material.

29. An image forming apparatus, comprising:
an optical scanning device according to claim 24;
a printer controller for converting code data, inputted from an external equipment, into an imagewise signal and for applying the imagewise signal to said optical scanning device.

30. A color image forming apparatus, comprising:
at least one optical scanning device according to claim 24; and
a plurality of image bearing members on which images of different colors are to be formed.

31. An apparatus according to claim 24, further comprising a printer controller for converting a color signal, inputted from an external equipment, into imagewise data of different colors and for applying the imagewise data to corresponding optical scanning devices, respectively.

* * * * *

UNITED STATES PATENT AND TRADEMARK OFFICE
CERTIFICATE OF CORRECTION

PATENT NO. : 7,034,859 B2
APPLICATION NO. : 10/633521
DATED : April 25, 2006
INVENTOR(S) : Keiichiro Ishihara et al.

It is certified that error appears in the above-identified patent and that said Letters Patent is hereby corrected as shown below:

COLUMN 10
    Line 14, "If" should read --It--;
    Line 25, "If" should read --It--.

COLUMN 12
    Line 66, "ca" should read --can--.

COLUMN 13
    Line 50, "exist" should read --exit--.

COLUMN 19
    Line 56, "angel" should read --angle--.

COLUMN 23
    Line 49, "$0.9x \leq \phi_{so} \leq \phi_{si} \leq 1.1x\phi_{so}$" should read --$0.9x\phi_{so} \leq \phi_{si} \leq 1.1x\phi_{so}$--.

COLUMN 25
    Line 24, "mount" should read --amount--; and
    Line 55, "our" should read --four--.

COLUMN 27
    Line 18, "73," should read --7e,--.

COLUMN 29
    Line 11, "are of" should read --are a pair of--; and
    Line 50, "devise 11-14" should read --devices 11-14--.

COLUMN 33
    Line 4, "principal" should read --principal ray--; and
    Line 52, "to" should read --to a--.

UNITED STATES PATENT AND TRADEMARK OFFICE
CERTIFICATE OF CORRECTION

PATENT NO. : 7,034,859 B2
APPLICATION NO. : 10/633521
DATED : April 25, 2006
INVENTOR(S) : Keiichiro Ishihara et al.

It is certified that error appears in the above-identified patent and that said Letters Patent is hereby corrected as shown below:

COLUMN 34
Line 42, "claim 24;" should read --claim 24; and--.

Signed and Sealed this

Twenty-sixth Day of December, 2006

JON W. DUDAS
*Director of the United States Patent and Trademark Office*